United States Patent
Bao et al.

(10) Patent No.: US 12,432,782 B2
(45) Date of Patent: Sep. 30, 2025

(54) METHOD FOR RANDOM ACCESS PROCEDURE FALLBACK, DEVICE, AND SYSTEM

(71) Applicant: VIVO MOBILE COMMUNICATION CO., LTD., Guangdong (CN)

(72) Inventors: Wei Bao, Guangdong (CN); Yitao Mo, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 434 days.

(21) Appl. No.: 17/571,751

(22) Filed: Jan. 10, 2022

(65) Prior Publication Data

US 2022/0132589 A1 Apr. 28, 2022

Related U.S. Application Data

(63) Continuation of application No. PCT/CN2020/100005, filed on Jul. 2, 2020.

(30) Foreign Application Priority Data

Jul. 12, 2019 (CN) .......................... 201910631589.8

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ........... H04W 74/0833; H04W 74/006; H04W 74/008
(Continued)

(56) References Cited

U.S. PATENT DOCUMENTS 9,107,225 B2 * 8/2015 Lee ................... H04W 74/0833
2017/0339629 A1 11/2017 Lindoff et al.
(Continued)

FOREIGN PATENT DOCUMENTS

| CN | 106714315 A | 5/2017 |
| CN | 108271275 A | 7/2018 |

(Continued)

OTHER PUBLICATIONS

Sony et al. "Consideration on fall back procedure from 2-step RACH to 4-step RACH," 3GPP TSG RAN WG2 Meeting #106, R2-1907046, May 17, 2019 (Year: 2019).*

(Continued)

*Primary Examiner* — Khaled M Kassim
*Assistant Examiner* — Oladiran Gideon Olaleye
(74) *Attorney, Agent, or Firm* — Price Heneveld LLP

(57) ABSTRACT

A method for random access procedure fallback, a device, and a system. The method includes: in a case that UE initiates a first random access procedure, falling back from the first random access procedure to a target random access procedure based on first information, where the first information is information about the first random access procedure or information about the target random access procedure. The embodiments of this disclosure are applied to a process in which the UE performs random access procedure fallback.

14 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0103465 A1 | 4/2018 | Agiwal et al. | |
| 2018/0206227 A1 | 7/2018 | Jiang | |
| 2018/0324854 A1* | 11/2018 | Phuyal | H04W 74/0833 |
| 2019/0075598 A1* | 3/2019 | Li | H04W 74/0833 |
| 2019/0335515 A1 | 10/2019 | Chen et al. | |
| 2020/0374966 A1 | 11/2020 | Chang et al. | |
| 2020/0382994 A1 | 12/2020 | Fujishiro | |
| 2020/0404711 A1 | 12/2020 | Zhao et al. | |

FOREIGN PATENT DOCUMENTS

| | | | |
|---|---|---|---|
| CN | 108282901 A | 7/2018 | |
| CN | 109155967 A | 1/2019 | |
| CN | 109392059 A | 2/2019 | |
| CN | 109587789 A | 4/2019 | |
| WO | 2018075534 A1 | 4/2018 | |
| WO | WO-2018126418 A1 * | 7/2018 | H04L 69/28 |
| WO | 2018145787 A1 | 8/2018 | |
| WO | 2019062928 A1 | 4/2019 | |
| WO | WO-2019074436 A1 * | 4/2019 | H04W 4/70 |
| WO | 2019102965 A1 | 5/2019 | |
| WO | WO-2019134566 A1 * | 7/2019 | H04W 74/0833 |

OTHER PUBLICATIONS

MediaTek, "MediaTek view on Release 17", 3GPP TSG RAN #84 Newport Beach, CA, USA, Jun. 3-6, 2019.
Sony, "Consideration on fall back procedure from 2-step RACH to 4-step RACH", 3GPP TSG RAN WG2 Meeting #106, R2-1907046, Reno, USA, May 13-17, 2019.
MediaTek Inc., "EDT RACH Fallback", 3GPP TSG-RAN WG2 Meeting #101, R2-1802611, Athens, Greece, Feb. 26-Mar. 2, 2018.
CMCC, "Fallback from 2-step to 4-step RA", 3GPP TSG-RAN WG2 #106, R2-1905923, Reno, USA, May 13-17, 2019.
Vivo, "Selection Between 2-step and 4-step RACH", 3GPP TSG-RAN WG2 Meeting #106, R2-1905653, Reno, USA, May 13-17, 2019.
Oppo, "Fall back mechanisms for 2-steps RACH", 3GPP TSG-RAN WG2 Meeting #106, R2-1905599, Reno, USA, May 13-May 17, 2019.
Huawei et al., "Discussion on 2-step RACH procedure", 3GPP TSG RAN WG1 Meeting #97, R1-1906051, Reno, USA, May 13-May 17, 2019.
Huawei et al., "MAC-RRC modelling and fallback scenarios for EDT", 3GPP TSG-RAN WG2 Meeting #101, R2-1802219, Athens, Greece, Feb. 26-Mar. 2, 2018.

* cited by examiner

METHOD FOR RANDOM ACCESS PROCEDURE FALLBACK, DEVICE, AND SYSTEM

This application is a continuation application of International Application No. PCT/CN2020/100005 filed on Jul. 2, 2020, which claims priority to Chinese Patent Application No. 201910631589.8, filed with the China National Intellectual Property Administration on Jul. 12, 2019 and entitled "METHOD FOR RANDOM ACCESS PROCEDURE FALLBACK, DEVICE, AND SYSTEM", which are incorporated herein by reference in their entireties.

TECHNICAL FIELD

Embodiments of this disclosure relate to the field of communications technologies, and in particular, to a method for random access procedure fallback, a device, and a system.

BACKGROUND

In a new radio (NR) system, user equipment (UE) may perform data transmission in a random access procedure (for example, a 2-step random access procedure (2-step RACH)). That is, UE in a non-connected state (that is, in an idle state or inactive state) may complete data transmission without changing its radio resource control (RRC) state. Such data transmission in a random access procedure is early data transmission (EDT).

However, when the UE fails the EDT, the UE may continuously perform EDT attempts during the random access procedure, which results in relatively large delay and signaling overheads in a data transmission process.

SUMMARY

Embodiments of this disclosure provide a method for random access procedure fallback, a device, and a system.

The following technical solutions are used in the embodiments of this disclosure:

A first aspect of the embodiments of this disclosure provides a method for random access procedure fallback, applied to UE. The method for random access procedure fallback includes: in a case that the UE initiates a first random access procedure, falling back from the first random access procedure to a target random access procedure based on first information, where the first information is information about the first random access procedure or information about the target random access procedure.

A second aspect of the embodiments of this disclosure provides a method for random access procedure fallback, applied to a network device. The method for random access procedure fallback includes: transmitting a target response message to UE, where the target response message is a response message of a target random access procedure, the target response message includes first indication information, and the first indication information is used to indicate that the UE is to fall back to the target random access procedure.

A third aspect of the embodiments of this disclosure provides UE, where the UE may include a fallback module. The fallback module is configured to: in a case that the UE initiates a first random access procedure, fall back from the first random access procedure to a target random access procedure based on first information, where the first information is information about the first random access procedure or information about the target random access procedure.

A fourth aspect of the embodiments of this disclosure provides a network device, and the network device may include a transmitting module. The transmitting module is configured to: transmit a target response message to user equipment UE, where the target response message is a response message of a target random access procedure, the target response message includes first indication information, and the first indication information is used to indicate that the UE is to fall back to the target random access procedure.

A fifth aspect of the embodiments of this disclosure provides UE. The UE includes a processor, a memory, and a computer program stored on the memory and capable of running on the processor. When the computer program is executed by the processor, the steps of the method for random access procedure fallback according to the first aspect are implemented.

A sixth aspect of the embodiments of this disclosure provides a network device. The network device includes a processor, a memory, and a computer program stored on the memory and capable of running on the processor. When the computer program is executed by the processor, the steps of the method for random access procedure fallback according to the second aspect are implemented.

A seventh aspect of the embodiments of this disclosure provides a communications system. The communications system includes the UE described in the third aspect and the network device described in the fourth aspect; or the communications system includes the communications system described the UE described in the fifth aspect and the network device described in the sixth aspect.

An eighth aspect of the embodiments of this disclosure provides a computer-readable storage medium, where a computer program is stored in the computer-readable storage medium. When the computer program is executed by a processor, the steps of the method for random access procedure fallback according to the first aspect or the steps of the method for random access procedure fallback according to the second aspect are implemented.

DETAILED DESCRIPTION OF EMBODIMENTS

Figure 1:
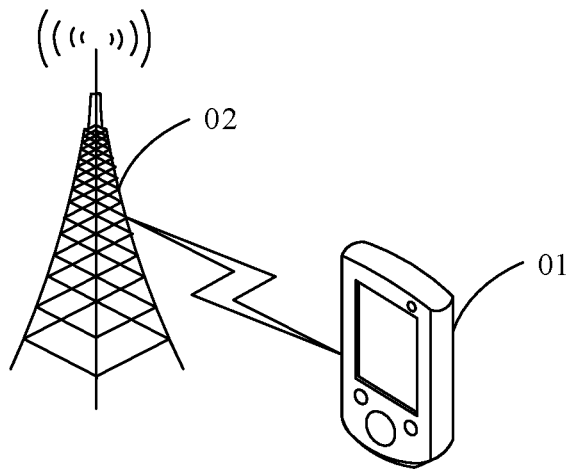
FIG. 1 is a schematic architectural diagram of a communications system according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In this specification and claims of the embodiments of this disclosure, the terms such as "first" and "second" are intended to distinguish between similar objects, but not to necessarily describe a specific order of the objects. For example, a first indication message and a second indication message are used to distinguish different indication messages, but are not used to indicate a particular order of the indication messages.

In the descriptions of the embodiments of this disclosure, "a plurality of" means at least two, unless otherwise specified. For example, a plurality of elements means two elements or more than two elements.

The term "and/or" in this specification describes an association relationship for describing associated objects and represents that three relationships may exist. For example, display panel and/or backlight may represent the following three cases: display panel alone, both display panel and backlight, and backlight alone. The symbol "/" in this specification indicates an "or" relationship between the associated objects, for example, input/output means input or output.

In the embodiments of this disclosure, terms such as "an example" or "for example" are used to represent examples, illustrations, or explanations. Any embodiment or design solution described as "an example" or "for example" in the embodiments of this disclosure should not be construed as being more preferred or advantageous than other embodiments or design solutions. To be precise, the words such as "an example" or "for example" are intended to present a related concept in a specific manner.

The following describes some concepts and/or terms used in a method for random access procedure fallback, a device, and a system provided in the embodiments of this disclosure.

EDT: UE in a non-connected state (that is, in an idle state or inactive state) is able to perform small data transmission (such as automatic reporting of water metering data) through a simple signaling process to avoid RRC status switching and overheads for RRC signaling. In long term evolution (ILTE), two schemes are introduced to EDT: uplink (UL) control plane (CP) and user plane (UP).

Characteristics of the UL CP scheme lie in that RRC signaling is used for carrying small data for transmission to avoid establishment of a data radio bearer (DRB); and all messages are transmitted based on default configuration over a signaling radio bearer (SRB) 0, with no need to enter an RRC connected state, and segmentation is not supported in a radio link control (RLC) transparent mode (TM). Uplink user data may be directly carried, in a form similar to a non-access stratum (NAS) message, to an uplink RRC early data request message for transmission. Downlink user data may be carried, in a form similar to a NAS message, to a downlink RRC early data complete message for transmission.

UL UP: In a case that the UE has configured a DRB but is not in the RRC connected state, the UE may perform UL UP EDT. The UE is in a state similar to an inactive state, all DRBs are suspended. In a normal data transmission process, the UE needs to restore RRC connection and enter the connected state before normal transmission and reception of data. However, for UL UP EDT, small data transmission can be implemented with relatively small signaling overheads, without RRC state switching.

UP EDT uses a DRB for transmission and security has been activated. Therefore, necessary security protection, such as an encryption or integrity protection operation, can be implemented for data in UP EDT. From the security perspective, the UE in a suspended state may have moved to coverage of another base station, and a security key used for retransmitting a packet by the UE needs to be updated in this case. The UE may perform an update operation on a next key based on parameters used for calculating a next-hop key and provided by the network device to the UE when the UE enters the suspended state.

UL UP EDT data is carried on a dedicated traffic channel (DTCH), and is transmitted after being multiplexed with an uplink RRC connection resume request message. Similarly, if there is a downlink message as a reply, the downlink message may also be carried on the DTCH and transmitted after being multiplexing with a downlink RRC connection release message. Both the uplink data and downlink data are encrypted, and the next key that is updated may be used for encryption operation. The transmission mode may be an RLC unacknowledged mode (UM) or acknowledged mode (AM), without segmentation.

The EDT process mainly affects the random access procedure at the media access control (MAC) layer. In an original random access procedure, a preamble sequence is transmitted in a message 1 (Msg1) and is used for timing advance (TA) measurement and request; uplink grant (UL grant) and TA are allocated through a message 2 (Msg2); a message 3 (Msg3) is transmitted over an uplink common control channel (CCCH) and is typically an RRC connection establishment request or an RRC connection resume request; and a message 4 (Msg4) is used for contention resolution. In EDT, however, data transmission is performed without state switching, and therefore, user data is transmitted directly through a Msg3. Compared with the conventional Msg3, the Msg3 in EDT requires a larger UL grant for carrying user data. Therefore, even from transmission of the preamble in the Msg1, different requests need to be transmitted to the network device for distinguishing between the conventional RACH and the EDT RACH, so that the network device can allocate sufficient resources for the UE through the Msg2 for data transmission. Correspondingly, in the EDT RACH, user data is carried in the Msg3 for transmission, and a subsequent contention resolution time is relatively long, thereby requiring an EDT-dedicated contention resolution timer that is long enough to ensure successful completion of the EDT process.

4-step random access procedure (4-step RACH): The network device configures random access configuration information for the UE, where the configuration information may include at least one of the following: Msg1 transmission resource information and RACH related parameters; the UE triggers a RACH procedure to transmit request information preamble (Msg1) to the network device; the network device transmits random access response information (Msg2) to the UE, where the random access response information includes at least one of the following: backoff indicator information, uplink resource grant, TA, RNTI information, and the like; the UE uses a resource indicated by the uplink grant in the Msg2 to transmit a Msg3 message, where the Msg3 may carry identity information of the UE; and the network device returns a Msg4 to the UE, where the Msg4 carries a contention resolution ID for identifying an identity of the UE.

It should be noted that the UE retransmits the Msg1 if the UE fails to receive the Msg2 in an Msg2 window. If the UE receives the contention resolution ID of the UE in the Msg4, the RACH procedure is considered to be successful; otherwise, the UE retransmits the Msg1 after the failure. When a cumulative number of RACH procedure attempts by the UE reaches a threshold, it is considered that an unrecoverable radio link problem has occurred, and the MAC layer reports a failure indication, such as radio link failure (RLF), to the RRC layer.

2-step random access procedure: The network device configures 2-step random access configuration information for the UE, where the configuration information may include transmission resource information corresponding to a message A (MsgA) and a message B (MsgB); the UE triggers a 2-step random access procedure (2-step RACH) to transmit request information (MsgA) to the network device, for example, the UE may transmit the request information to the network device over a PUSCH; and the network device transmits a response message (MsgB) to the UE.

It should be noted that the UE retransmits the MsgA if the UE fails to receive the MsgB. For the 2-step RACH, the MsgA is equivalent to a combination of the Msg1 and Msg3 in the normal 4-step RACH procedure, and the MsgB is equivalent to a combination of the Msg2 and Msg4 in the normal 4-step RACH procedure.

The embodiments of this disclosure provide a method for random access procedure fallback, a device, and a system. In a case that the UE initiates a first random access procedure, the UE may fall back from the first random access procedure to a target random access procedure based on first information (where the first information is information about the first random access procedure or information about the target random access procedure). The UE can perform fallback during initiation of the first random access procedure based on the information about the first random access procedure or information about the target random access procedure, instead of continuously attempting to initiate the first random access procedure, thereby reducing a delay and signaling overheads for data transmission in the random access procedure.

The method for random access procedure fallback, the device, and the system provided in the embodiments of this disclosure may be applied to a communications system, specifically, may be applied to a process in which the UE performs random access procedure fallback based on the communications system.

FIG. 1 is a schematic architectural diagram of a communications system according to an embodiment of this disclosure. As shown in FIG. 1, the communications system may include UE 01 and a network device 02. A connection may be established between the UE 01 and the network device 02 for communication.

The UE is a device that provides a user with voice and/or data connectivity, a handheld device with a wired/wireless connection function, or another processing device connected to a wireless modem. The UE may communicate with one or more core network devices through a radio access network (RAN). The UE may be a mobile terminal such as a mobile phone (or referred to as "cellular" phone) and a computer having a mobile terminal, such as a portable, pocket-sized, handheld, computer built-in, or in-vehicle mobile apparatus, which exchanges voice and/or data with the RAN; or may be a device such as a personal communication service (PCS) phone, a cordless phone, a session initiation protocol (SIP) phone, a wireless local loop (WLL) station, or a personal digital assistant (PDA). The UE may alternatively be referred to as a user agent, a terminal device, or the like.

The network device may be a base station. The base station is an apparatus deployed in the RAN and configured to provide a wireless communication function for the UE. The base station may include a macro base station, a micro base station, a relay station, an access point, and the like in various forms. In systems using different radio access technologies, devices having base station functions may have different names, for example, being referred to as a base station (NodeB) in a third generation (3G) mobile communications network, referred to as an evolved NodeB (eNB or eNodeB) in an LTE system, referred to as a gNB in a fifth generation (5G) mobile communication network, and the like. With evolution of the communications technologies, the name "base station" may change.

The following describes in detail a method for random access procedure fallback, a device, and a system provided in the embodiments of this disclosure by using specific embodiments and application scenarios thereof with reference to the accompanying drawings.

Figure 2:
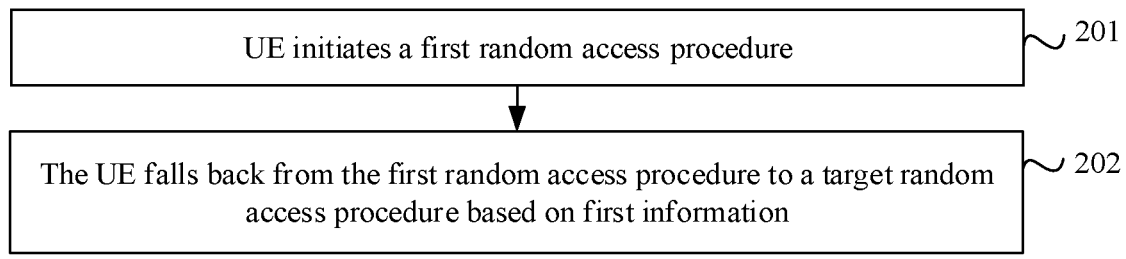
FIG. 2 is a first schematic diagram of a method for random access procedure fallback according to an embodiment of this disclosure.

Based on the communications system shown in FIG. 1, an embodiment of this disclosure provides a method for random access procedure fallback. As shown in FIG. 2, the method for random access procedure fallback may include the following step 201 to step 202.

Step 201: UE initiates a first random access procedure.

Optionally, in this embodiment of this disclosure, the first random access procedure may be an EDT random access procedure.

Optionally, in this embodiment of this disclosure, the first random access procedure may be specifically an EDT 2-step random access procedure or an EDT 4-step random access procedure.

Optionally, in this embodiment of this disclosure, the UE may select a MsgA resource to initiate MsgA transmission (transmitting a MsgA to the network device), where the MsgA carries uplink EDT data.

Optionally, in this embodiment of this disclosure, the UE may select a Msg1 resource to initiate Msg1 transmission (transmitting a Msg1 to the network device), where the Msg1 carries uplink EDT data.

Optionally, in this embodiment of this disclosure, the first random access procedure is an EDT random access procedure. The foregoing step 201 may be specifically implemented by using the following step 201a.

Step 201a: In a case that the UE satisfies a second condition, the UE initiates the first random access procedure.

In this embodiment of this disclosure, the second condition includes at least one of the following: a service to be transmitted by the UE satisfies a trigger condition of a 2-step random access procedure or a 4-step random access procedure, a data volume of the service to be transmitted by the UE satisfies a resource restriction condition of an EDT random access procedure, and a type of the UE satisfies an initiation restriction condition of the EDT random access procedure.

It should be noted that the service to be transmitted by the UE meeting the trigger condition of the 2-step random access procedure or 4-step random access procedure can be understood as: whether the service to be transmitted by the UE can trigger the 2-step random access procedure or the 4-step random access procedure. The data volume of the service to be transmitted by the above UE meeting the resource restriction condition of the EDT random access procedure can be understood as: whether a resource of the EDT random access procedure can be used for transmitting the service to be transmitted by the UE. The type of UE meeting the initiation restriction condition of the EDT random access procedure can be understood as: which type of UE is allowed to initiate the EDT random access procedure, for example, NR-type UE is allowed to initiate the EDT random access procedure while other types of UEs are not allowed to initiate the EDT random access procedure.

Optionally, in this embodiment of this disclosure, when the UE satisfies the second condition, the UE may initiate MsgA transmission (transmitting the MsgA to the network device), where the MsgA carries uplink EDT data.

Optionally, in this embodiment of this disclosure, when the UE satisfies the second condition, the UE may initiate Msg1 transmission (transmitting the Msg1 to the network device), where the Msg1 carries uplink EDT data.

Step 202: The UE falls back from the first random access procedure to a target random access procedure based on first information.

In this embodiment of this disclosure, in a case that the UE initiates the first random access procedure, the UE may fall back from the first random access procedure to the target random access procedure based on the first information. The first information is the information about the first random access procedure or the information about the target random access procedure.

Optionally, in this embodiment of this disclosure, the first information may include first parameter information or first indication information.

The first parameter information may include at least one of the following: the number of times that the UE initiates the first random access procedure and total duration of the first random access procedures initiated by the UE. The first indication information is information carried in a response message of the target random access procedure, and the first indication information is used to indicate that the UE is to fall back to the target random access procedure.

It can be understood that the information about the first random access procedure may include at least one of the following: the number of times that the UE initiates the first random access procedure and the total duration of the first random access procedures initiated by the UE; and the information about the target random access procedure may be the response message of the target random access procedure.

Optionally, in this embodiment of this disclosure, in a case that the UE fails to initiate the first random access procedure, the UE may fall back from the first random access procedure to the target random access procedure based on the first parameter information.

It should be noted that in this embodiment of this disclosure, the UE falling back from the first random access procedure to the target random access procedure can be understood as: the UE gives up continuously initiating the first random access procedure, and initiates the target random access procedure.

Optionally, in this embodiment of this disclosure, the first random access procedure is an EDT 2-step random access procedure, and the target random access procedure is a 2-step random access procedure, a 4-step random access procedure, or an EDT 4-step random access procedure.

Optionally, in this embodiment of this disclosure, the first random access procedure is an EDT 4-step random access procedure, and the target random access procedure is a 2-step random access procedure, a 4-step random access procedure, or an EDT 2-step random access procedure.

It should be noted that, for the description of the 2-step random access procedure and the 4-step random access procedure, reference may be made to the description in the foregoing embodiment, and details are not repeated herein.

In the method for random access procedure fallback provided in this embodiment of this disclosure, in the case that the UE initiates the first random access procedure, the UE may fall back from the first random access procedure to the target random access procedure based on the first information (where the first information is the information about the first random access procedure or the information about the target random access procedure). The UE can perform fallback during initiation of the first random access procedure based on the information about the first random access procedure or information about the target random access procedure, instead of continuously attempting to initiate the first random access procedure, thereby reducing a delay and signaling overheads for data transmission in the random access procedure.

Figure 3:
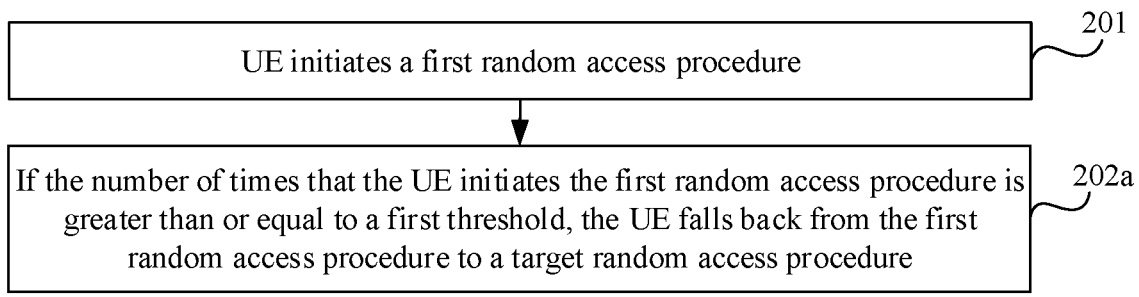
FIG. 3 is a second schematic diagram of a method for random access procedure fallback according to an embodiment of this disclosure.

Optionally, in a possible implementation of this embodiment of this disclosure, the first information includes the first parameter information, and the first parameter information includes the number of times that the UE initiates the first random access procedure. With reference to FIG. 2, as shown in FIG. 3, the foregoing step 202 may be specifically implemented by using the following step 202a.

Step 202a: If the number of times that the UE initiates the first random access procedure is greater than or equal to a first threshold, the UE falls back from the first random access procedure to the target random access procedure.

In this embodiment of this disclosure, the UE may attempt to initiate the first random access procedure, and if the number of attempts is detected to be greater than or equal to the first threshold, falls back from the first random access procedure to the target random access procedure.

Optionally, in this embodiment of this disclosure, the first threshold may be configured by the network device or predefined by the UE.

Optionally, in this embodiment of this disclosure, the first threshold may be configured by the network device for the UE by using a system information block (SIB) or dedicated signaling. It should be noted that the network device may configure a different first threshold for each possible fallback scenario, or may configure one common first threshold for various fallback scenarios.

Optionally, in this embodiment of this disclosure, an initial value of a counter for the number of times that the UE initiates the first random access procedure is 0. Each time the first random access procedure is initiated, the counter is incremented by 1 to record the number of times that the UE initiates the first random access procedure.

It should be noted that if the UE currently initiates a Msg1 transmission process but does not satisfy the second condition (for example, arrival of new uplink data causes the data volume of the service to be transmitted to exceed a maximum resource size configured for the EDT random access procedure), the UE is not allowed to initiate the first random access procedure again. In this case, the UE may automatically fall back to the 2-step random access procedure or the 4-step random access procedure, and the counter for the number of times that the first random access procedure is initiated is reset.

It should be noted that, in a case that the number of times that the UE initiates the first random access procedure is greater than or equal to the first threshold, even if a condition (the second condition) for initiating the first random access procedure is satisfied when the UE attempts to initiate a random access procedure again, the UE is not allowed to initiate the first random access procedure again, but needs to fall back to the 2-step random access procedure or the 4-step random access procedure.

Optionally, in this embodiment of this disclosure, if the number of times that the UE initiates the first random access procedure is less than the first threshold, the UE continues to perform the first random access procedure.

In this embodiment of this disclosure, based on the number of times that the UE initiates the first random access procedure, the UE can determine whether to fall back from the first random access procedure to the target random access procedure, instead of continuously attempting to initiate the first random access procedure, thereby reducing a delay and signaling overheads for data transmission in the random access procedure.

Optionally, in this embodiment of this disclosure, the target random access procedure is a 2-step random access procedure or a 4-step random access procedure. The foregoing step 202a may be specifically implemented by using the following step 202a1 or step 202a2.

Step 202a1: If the number of times that the UE initiates the first random access procedure is greater than or equal to the first threshold and a first fallback random number is less than a fallback random number threshold, the UE falls back from the first random access procedure to the 2-step random access procedure.

In this embodiment of this disclosure, the first fallback random number is a fallback random number generated by the UE.

It should be noted that in a case that the number of times that the UE initiates the first random access procedure is greater than or equal to the first threshold, the UE may determine, based on a load status by using a specific fallback random number (the first fallback random number), whether the UE falls back to the 4-step random access procedure or the 2-step random access procedure, and the threshold of the first fallback random number is configured by the network device. For example, if the fallback random number threshold is 0.4, the UE falls back from the first random access procedure to the 2-step random access procedure when the first fallback random number is less than 0.4. In this way, the 2-step random access procedure and the 4-step random access procedure may be selected based on probabilities of 40% and 60%, respectively.

Step 202a2: If the number of times that the UE initiates the first random access procedure is greater than or equal to the first threshold and the first fallback random number is greater than the fallback random number threshold, the UE falls back from the first random access procedure to the 4-step random access procedure.

Optionally, in this embodiment of this disclosure, if the number of times that the UE initiates the first random access procedure is greater than or equal to the first threshold, and the first fallback random number is equal to the fallback random number threshold, the UE may randomly select a random access procedure (for example, the 2-step random access procedure or the 4-step random access procedure), and fall back from the first random access procedure to the randomly selected random access procedure.

Optionally, in this embodiment of this disclosure, the target random access procedure is a 2-step random access procedure or a 4-step random access procedure. The foregoing step 202a may be specifically implemented by using the following step 202a3 or step 202a4.

Step 202a3: If the number of times that the UE initiates the first random access procedure is greater than or equal to the first threshold and the first fallback random number is less than the fallback random number threshold, the UE falls back from the first random access procedure to the 4-step random access procedure.

Step 202a4: If the number of times that the UE initiates the first random access procedure is greater than or equal to the first threshold and the first fallback random number is greater than the fallback random number threshold, the UE falls back from the first random access procedure to the 2-step random access procedure.

In this embodiment of this disclosure, in a case that the number of times that the UE initiates the first random access procedure is greater than or equal to the first threshold, the UE may determine, based on a value relationship between a randomly generated fallback random number (the first fallback random number) and the fallback random number threshold, whether to fall back from the first random access procedure to the 2-step random access procedure or the 4-step random access procedure, so as to ensure load balancing in the random access procedure of the UE.

Figure 4:
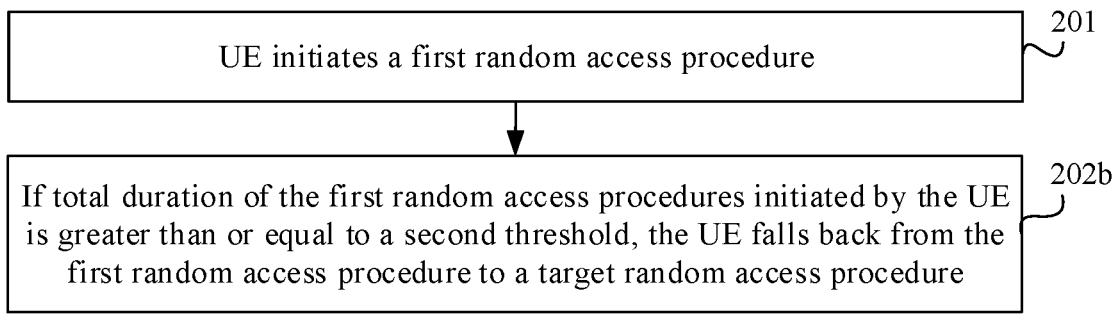
FIG. 4 is a third schematic diagram of a method for random access procedure fallback according to an embodiment of this disclosure.

Optionally, in another possible implementation of this embodiment of this disclosure, the first information includes the first parameter information, and the first parameter information includes the total duration of the first random access procedures initiated by the UE. With reference to FIG. 2, as shown in FIG. 4, the foregoing step 202 may be specifically implemented by using the following step 202b.

Step 202b: If the total duration of the first random access procedures initiated by the UE is greater than or equal to a second threshold, the UE falls back from the first random access procedure to the target random access procedure.

In this embodiment of this disclosure, the UE may attempt to initiate the first random access procedure, and if the total duration of attempts is detected to be greater than or equal to the second threshold, falls back from the first random access procedure to the target random access procedure.

Optionally, in this embodiment of this disclosure, the second threshold may be configured by the network device or predefined by the UE.

Optionally, in this embodiment of this disclosure, the second threshold may be configured by the network device for the UE by using a SIB or dedicated signaling. It should be noted that the network device may configure a different second threshold for each possible fallback scenario, or may configure one common second threshold for various fallback scenarios.

Optionally, in this embodiment of this disclosure, when the UE initiates the first random access procedure for the first time, a timer for initiating the first random access procedure is started. A time point of starting the timer is specified by a standard, for example, the time point of starting the timer is a time point of triggering initiation of the first random access procedure for the first time, or a starting position or an ending position of a Msg1 resource corresponding to the first random access procedure initiated for the first time.

It should be noted that if the UE currently initiates a Msg1 transmission process but does not satisfy the second condition (for example, arrival of new uplink data causes the data volume of the service to be transmitted to exceed a maximum resource size configured for the EDT random access procedure), the UE is not allowed to initiate the first random access procedure again. In this case, the UE may automatically fall back to the 2-step random access procedure or the 4-step random access procedure, and the timer for initiating the first random access procedure is stopped.

It should be noted that, in a case that the total duration of the first random access procedures initiated by the UE is greater than or equal to the second threshold, even if a condition (the second condition) for initiating the first random access procedure is satisfied when the UE attempts to initiate a random access procedure again, the UE is not allowed to initiate the first random access procedure again, but needs to fall back to the 2-step random access procedure or the 4-step random access procedure.

Optionally, in this embodiment of this disclosure, if the total duration of the first random access procedures initiated by the UE is less than the second threshold, the UE continues to perform the first random access procedure.

In this embodiment of this disclosure, based on the total duration of the first random access procedures initiated by the UE, the UE can determine whether to fall back from the first random access procedure to the target random access procedure, instead of continuously attempting to initiate the first random access procedure, thereby reducing a delay and signaling overheads for data transmission in the random access procedure.

Optionally, in this embodiment of this disclosure, the target random access procedure is a 2-step random access procedure or a 4-step random access procedure. The foregoing step 202b may be specifically implemented by using the following step 202b1 or step 202b2.

Step 202b1: If the total duration of the first random access procedures initiated by the UE is greater than or equal to the second threshold, and the first fallback random number is less than the fallback random number threshold, the UE falls back from the first random access procedure to the 2-step random access procedure.

Step 202b2: If the total duration of the first random access procedures initiated by the UE is greater than or equal to the second threshold, and the first fallback random number is greater than the fallback random number threshold, the UE falls back from the first random access procedure to the 4-step random access procedure.

Optionally, in this embodiment of this disclosure, the target random access procedure is a 2-step random access procedure or a 4-step random access procedure. The foregoing step 202b may be specifically implemented by using the following step 202b3 or step 202b4.

Step 202b3: If the total duration of the first random access procedures initiated by the UE is greater than or equal to the second threshold, and the first fallback random number is less than the fallback random number threshold, the UE falls back from the first random access procedure to the 4-step random access procedure.

Step 202b4: If the total duration of the first random access procedures initiated by the UE is greater than or equal to the second threshold, and the first fallback random number is greater than the fallback random number threshold, the UE falls back from the first random access procedure to the 2-step random access procedure.

Optionally, in this embodiment of this disclosure, if the total duration of the first random access procedures initiated by the UE is greater than or equal to the second threshold, and the first fallback random number is equal to the fallback random number threshold, the UE may randomly select a random access procedure (for example, the 2-step random access procedure or the 4-step random access procedure), and fall back from the first random access procedure to the randomly selected random access procedure.

In this embodiment of this disclosure, when the total duration of the first random access procedures initiated by the UE is greater than or equal to the second threshold, the UE may determine, based on a value relationship between a randomly generated fallback random number (the first fallback random number) and the fallback random number threshold, whether to fall back from the first random access procedure to the 2-step random access procedure or the 4-step random access procedure, so as to ensure load balancing in the random access procedure of the UE.

Figure 5:
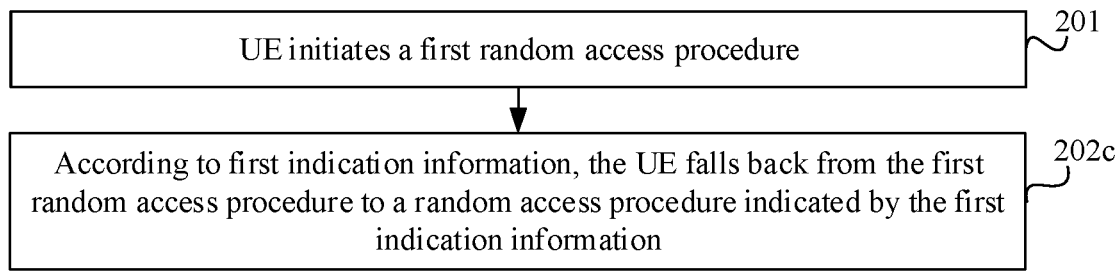
FIG. 5 is a fourth schematic diagram of a method for random access procedure fallback according to an embodiment of this disclosure.

Optionally, in another possible implementation in this embodiment of this disclosure, the first information includes the first indication information. With reference to FIG. 2, as shown in FIG. 5, the foregoing step 202 may be specifically implemented by using the following step 202c.

Step 202c: According to the first indication information, the UE falls back from the first random access procedure to a random access procedure indicated by the first indication information.

In this embodiment of this disclosure, the random access procedure indicated by the first indication information is any one of the following: a 2-step random access procedure, a 4-step random access procedure, an EDT 2-step random access procedure, and an EDT 4-step random access procedure.

Optionally, in this embodiment of this disclosure, in a case that the UE fails to initiate the first random access procedure, the UE may fall back, according to the first indication information, from the first random access procedure to the random access indicated by the first indication information; or in a case that the UE does not fail to initiate the first random access procedure, the UE may fall back, according to the first indication information, from the first random access procedure to the random access procedure indicated by the first indication information.

It should be noted that, if the first random access procedure is an EDT 2-step random access procedure and the random access procedure indicated by the first indication information is an EDT 2-step random access procedure, falling back from the first random access procedure to the random access procedure indicated by the first indication information can be understood as: continuing the EDT 2-step random access procedure. It should be noted that, if the first random access procedure is an EDT 4-step random access procedure and the random access procedure indicated by the first indication information is an EDT 4-step random access procedure, falling back from the first random access procedure to the random access procedure indicated by the first indication information can be understood as: continuing the EDT 4-step random access procedure.

In this embodiment of this disclosure, in the case that the UE initiates the first random access procedure, the UE can fall back from the first random access procedure to the target random access procedure according to indication of the first indication information, instead of continuously attempting to initiate the first random access procedure, thereby reducing a delay and signaling overheads for data transmission in the random access procedure.

Figure 6:
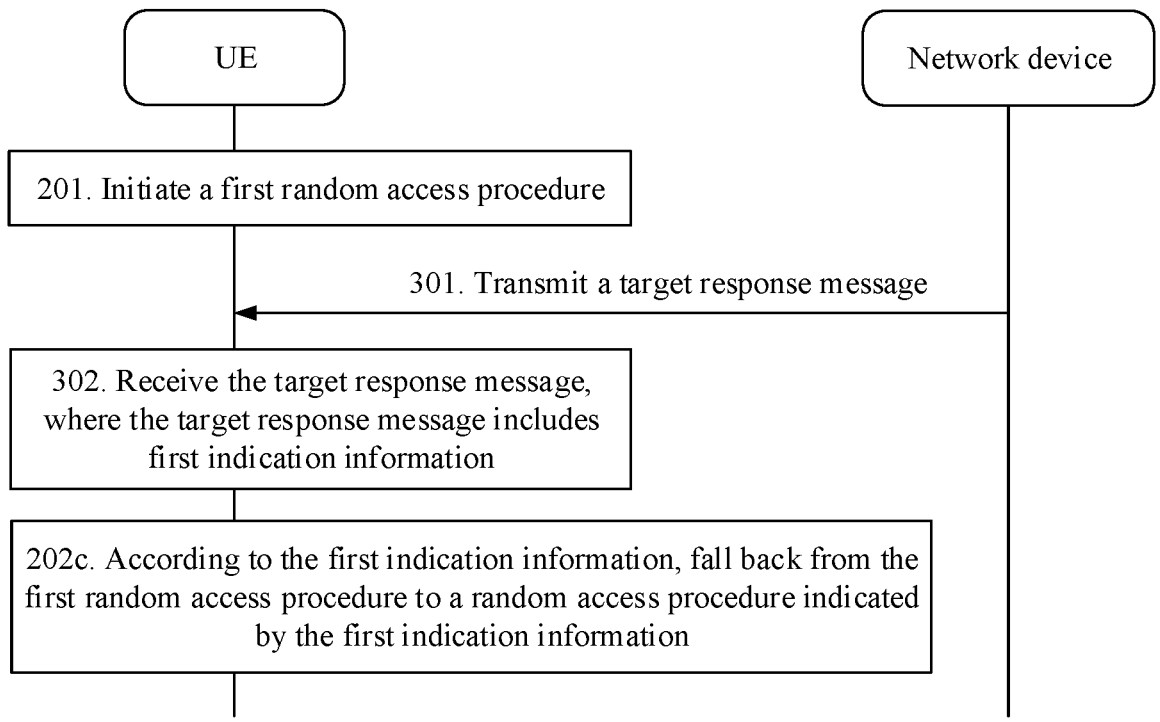
FIG. 6 is a fifth schematic diagram of a method for random access procedure fallback according to an embodiment of this disclosure.

Optionally, in this embodiment of this disclosure, with reference to FIG. 5, as shown in FIG. 6, before the foregoing step 202c, the method for random access procedure fallback provided in this embodiment of this disclosure may further include the following steps 301 and 302.

Step 301: The network device transmits a target response message to the UE.

In this embodiment of this disclosure, the target response message is a response message of the target random access procedure, the target response message includes the first indication information, and the first indication information is used to indicate that the UE is to fall back to the target random access procedure.

Optionally, in this embodiment of this disclosure, the target random access procedure may be any one of the following: a 2-step random access procedure, a 4-step random access procedure, an EDT 2-step random access procedure, and an EDT 4-step random access procedure.

Optionally, in this embodiment of this disclosure, the target response message may be a response message (MsgB) of the 2-step random access procedure; or the target response message may be a response message (Msg2) of the 4-step random access procedure.

Optionally, in this embodiment of this disclosure, the first random access procedure in step 202c is an EDT 2-step random access procedure, and the target random access procedure may be any one of the following: a 2-step random access procedure, a 4-step random access procedure, or an EDT 4-step random access procedure.

Optionally, in this embodiment of this disclosure, the first random access procedure in step 202c is an EDT 4-step random access procedure, and the target random access procedure may be a 4-step random access procedure.

Optionally, in this embodiment of this disclosure, after the foregoing step 301, the method for random access procedure fallback provided in this embodiment of this disclosure may further include the following steps 401 and 402.

Step 401: The UE transmits a target request message to the network device.

In this embodiment of this disclosure, the target request message is a request message for the 4-step random access procedure.

Optionally, in this embodiment of this disclosure, the target request message includes EDT data of the UE.

Optionally, in this embodiment of this disclosure, the target request message may be a Msg3 of the 4-step random access procedure, and the Msg3 carries the EDT data of the UE. It can be understood that when the first indication information in the target response message transmitted by the network device to the UE indicates that the UE falls back to the EDT 4-step random access procedure, the Msg3 transmitted by the UE to the network device carries the EDT data of the UE.

Optionally, in this embodiment of this disclosure, the target request message may be a Msg3 of the 4-step random access procedure, and the Msg3 carries no EDT data of the UE. It can be understood that when the first indication information in the target response message transmitted by the network device to the UE indicates that the UE falls back to the 4-step random access procedure, but not the EDT 4-step random access procedure, the Msg3 transmitted by the UE to the network device carries no EDT data of the UE.

It can be understood that after the UE initiates the EDT 2-step random access procedure (that is, transmitting the MsgA, where the MsgA carries the EDT data of the UE), the network device may transmit the target response message (Msg2) to the UE to indicate that the UE falls back to the 4-step random access procedure or EDT 4-step random access procedure, and then the UE may transmit the target request message (Msg3) to the network device.

Optionally, in this embodiment of this disclosure, when the UE satisfies the second condition, the UE transmits the target request message to the network device.

It should be noted that, for the description of the second condition, reference may be made to the description in the foregoing embodiment, and details are not repeated herein.

Step 402: The network device receives the target request message transmitted by the UE.

Step 302: The UE receives the target response message transmitted by the network device, where the target response message includes the first indication information.

In this embodiment of this disclosure, in the case that the UE initiates the first random access procedure, the UE can fall back from the first random access procedure to the target random access procedure according to the first indication information in the target response message transmitted by the network device, instead of continuously attempting to initiate the first random access procedure, thereby reducing a delay and signaling overheads for data transmission in the random access procedure.

Optionally, in this embodiment of this disclosure, after the foregoing step 201, the method for random access procedure fallback provided in this embodiment of this disclosure may further include the following step 501.

Step 501: In a case that a first condition is met, the UE reports second indication information to a higher layer.

In this embodiment of this disclosure, the second indication information is used to indicate that the UE has a radio link failure.

In this embodiment of this disclosure, the first condition includes at least one of the following: the number of times that the UE transmits a first message is greater than or equal to a third threshold, the number of times that the UE transmits a second message is greater than or equal to a fourth threshold, the total number of times that the UE transmits the first message and the second message is greater than or equal to a fifth threshold, and total duration of a random access procedure initiated by the UE is greater than or equal to a sixth threshold; and the first message is a request message for the 2-step random access procedure, and the second message is a request message for the 4-step random access procedure.

Optionally, in this embodiment of this disclosure, the first message is the MsgA of the 2-step random access procedure, and the second message is the Msg1 of the 4-step random access procedure.

Optionally, in this embodiment of this disclosure, the third threshold, fourth threshold, fifth threshold, and sixth threshold are configured by the network device or predefined by the UE.

It should be noted that the total duration of the random access procedure initiated by the UE can be understood as: total duration from initiating the first random access procedure by the UE to falling back to another random access procedure (for example, falling back to another random access procedure for the first time or falling back to other random access procedures for a plurality of times).

Optionally, in this embodiment of this disclosure, each time the UE re-initiates Msg1 or MsgA transmission (with or without UL EDT), a random access procedure (RACH) retransmission counter may be incremented by 1, and an initial value of the counter is 1. That is, initial Msg1 or MsgA transmission is counted as 1, and for each subsequent Msg1 or MsgA retransmission, the counter is incremented by 1. When a cumulative value of the counter is greater than a threshold (the third threshold or the fourth threshold), it is considered that there is an RACH exception, and then a radio link failure needs to be reported to the higher layer.

Optionally, in this embodiment of this disclosure, when the UE initiates Msg1 and MsgA transmission (with or without UL EDT), recording is performed by using respective counters, configured with respective thresholds or a uniform threshold. When a cumulative value of any one counter is greater than a threshold (the third threshold or the fourth threshold) of the counter, it is considered that there is an RACH exception, and then a radio link failure needs to be reported to the higher layer; or when both counters satisfy a condition of being greater than the thresholds of the counters, it is considered that there is an RACH exception, and then a radio link failure needs to be reported to the higher layer.

Optionally, in this embodiment of this disclosure, regardless of whether UL EDT is performed by the UE, if the Msg2 or Msg4 is not successfully received when a Msg2 reception timer (for example, a RAR window) or Msg4 reception timer (for example, a contention resolution timer) of the UE expires, the RACH retransmission counter is incremented by 1, where the initial value of the counter is 1. When the cumulative value of the counter is greater than the threshold, it is considered that there is an RACH exception, and then a radio link failure needs to be reported to the higher layer.

In this embodiment of this disclosure, during transmission of the first random access procedure (for example, EDT RACH), the UE may determine whether the first condition is satisfied to determine whether the first random access procedure becomes abnormal and whether it is required to report to the higher layer, so that the network device can perform link reestablishment, thereby improving the data transmission performance.

In the foregoing embodiment (for example, FIG. 2 to FIG. 5 in the foregoing embodiment), the method for random access procedure fallback provided in this embodiment of this disclosure is exemplarily described from the perspective of the UE and the network device. The following exemplarily describes the method for random access procedure fallback provided in this embodiment of this disclosure from the perspective of interaction between the UE and the network device with reference to FIG. 7 to FIG. 9.

Implementation 1

Figure 7:
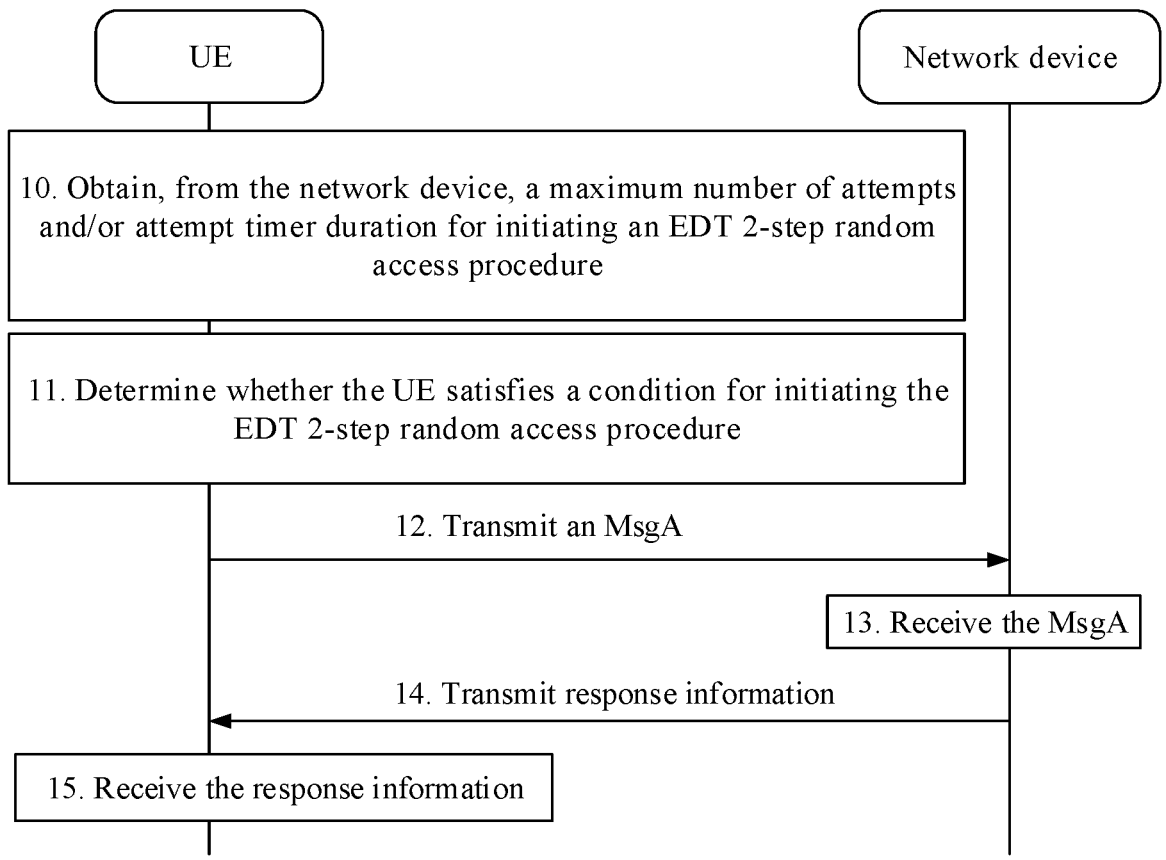
FIG. 7 is a sixth schematic diagram of a method for random access procedure fallback according to an embodiment of this disclosure.

In this implementation, a specific method for falling back from the EDT 2-step random access procedure to the 2-step random access procedure is mainly described. As shown in FIG. 7, the method for random access procedure fallback provided in this embodiment of this disclosure may include the following steps 10 to 15.

When the network device configures a fallback condition of the EDT 2-step random access procedure (UL EDT 2-step RACH) for the UE by using a SIB or dedicated signaling, the UE needs to check whether the condition is satisfied. Once the condition is met, the UE gives up another UL EDT 2-step RACH attempt, and initiates the normal 2-step RACH procedure. The network device may configure a different condition for each possible fallback scenario, or configure a common condition for various fallback scenarios.

Step 10: The UE obtains, from the network device, a maximum number of attempts and/or attempt timer duration for initiating the EDT 2-step random access procedure.

In this embodiment of this disclosure, the UE may obtain a fallback restriction condition from the network device, such as the maximum number of attempts (the first threshold) for initiating the EDT 2-step random access procedure, and the attempt timer duration (the second threshold) for initiating the EDT 2-step random access procedure.

Step 11: The UE determines whether the UE satisfies a condition for initiating the EDT 2-step random access procedure.

Step 12: The UE transmits a MsgA to the network device.

In this embodiment of this disclosure, if it is determined that the UE satisfies the condition (the second condition in the foregoing embodiment) for initiating the EDT 2-step random access procedure (UL EDT 2-step RACH), an appropriate resource for the MsgA is selected to initiate MsgA transmission, where the MsgA carries the UL EDT data of the UE.

The condition for determining by the UE whether to initiate the UL EDT 2-step RACH may include at least one of the following: a service to be transmitted by the UE satisfies a trigger condition of the EDT 2-step random access procedure, a data volume of the service to be transmitted by the UE satisfies a resource restriction condition of the EDT 2-step random access procedure, and a type of the UE satisfies an initiation restriction condition of the EDT 2-step random access procedure.

In addition, if the fallback condition is configured based on the number of attempts, the initial value of the UL EDT attempt counter is 0, and the counter is incremented by 1 each time the UL EDT attempt is performed. If the fallback condition is configured based on the timer duration, the UL EDT attempt timer is started when the UL EDT RACH is initiated for the first time. A time point of starting the timer is specified by the standard, for example, a time point of triggering the UL EDT for the first time, a starting position or an ending position of a MsgA resource carrying the UL EDT, or the like.

If the condition for carrying the UL EDT data is not satisfied in the current MsgA transmission, for example, arrival of new uplink data causes a data volume of to-be-transmitted data to exceed a maximum resource size configured for the UL EDT), the UE is not allowed to perform UL EDT RACH transmission. In this case, the UE automatically falls back to the normal RACH procedure, the UL EDT counter is reset, or the UL EDT attempt timer is stopped.

When the UE satisfies the UL EDT fallback condition, for example, the UL EDT attempt timer expires or the UL EDT counter is greater than the configured threshold, even if a condition for UL EDT 2-step RACH is satisfied when the UE attempts to initiate RACH again, the UE is not allowed to initiate the UL EDT 2-step RACH again, but needs to fall back to the normal 2-step RACH procedure.

A manner of distinguishing between the UL EDT 2-step RACH procedure and the 2-step RACH procedure may include at least one of the following: preamble sequences corresponding to the two procedures are different, and different preamble sequence spaces need to be selected for initiating different procedures; PUSCH configurations for the MsgA corresponding to the two procedures are different, and different PUSCH configurations need to be selected for initiating different procedures; PUSCH time-frequency positions for the MsgA corresponding to the two procedures are different, and different PUSCH time-frequency positions need to be selected for initiating different procedures; both preamble sequences and PUSCHs for the MsgA corresponding to the two procedures are different, and different MsgA need to be selected for initiating different procedures; and user data is not included in the 2-step RACH procedure (for non-connected-state UEs).

Step 13: The network device receives the MsgA transmitted by the UE.

Step 14: The network device transmits response information to the UE.

In this embodiment of this disclosure, after receiving the MsgA, the network device may determine, based on different preamble sequences or PUSCH resources for the MsgA, whether this is a normal 2-step RACH procedure (the 2-step RACH procedure) or an UL EDT RACH procedure, and transmits a response.

Generally, content of a response by the network device for the normal 2-step RACH may include at least one of the following: a random access preamble identifier (random access preamble identifier, RAP ID), used for distinguishing different preamble sequences; an uplink grant (UL Grant) for the UE, used for subsequent uplink data transmission; uplink timing advance (TA) for the UE; a cell identity (C-RNTI) allocated to the UE; and a contention resolution ID, used for identifying an identity of the UE for contention resolution.

In addition to the content of the response for the normal 2-step RACH, content of a response by the network device for the UL EDT 2-step RACH may also include: a reply to UL EDT content, such as early data complete or RRC release.

Step 15: The UE receives the response information transmitted by the network device.

In this embodiment of this disclosure, when the contention resolution is successful, it means that the RACH procedure of the UE is successful. Further, when a correct UL EDT response message is received, the UL EDT is successful. If other response messages for the UL EDT are received, UL EDT data transmission may be unsuccessful, and an operation is performed according to a command of the network device. For example, if the network device returns an RRC setup message, the UE enters a connected state and retransmits user data that has not been successfully transmitted in the UL EDT procedure.

If a response message for the UE has not been received until the contention resolution timer of the UE expires, the current RACH procedure fails. The UE goes back to step 11 and initiates the EDT 2-step RACH procedure again until the UE satisfies a RACH failure condition and performs reporting to the higher layer.

When the UE fails in the UL EDT 2-step RACH procedure for one time and satisfies a condition for falling back to a normal RACH (such as the 2-step random access procedure), the UE may possibly directly fall back to the 4-step RACH procedure, instead of falling back to the 2-step RACH procedure. For example, considering load balancing, the UE determines, based on a specific random number, whether to fall back to the 4-step RACH procedure or the 2-step RACH procedure. A threshold of the random number is network-configured. For example, whether to initiate the 4-step RACH or 2-step RACH is determined based on probabilities of 0.4 and 0.6, respectively.

When the UE performs a fallback operation, uplink power of the UE may or may not climb, which may be specified by the standard. Alternatively, whether the uplink power of the UE climbs may be determined according to different situations. For example, if resources for two UL transmissions of the Msg1 or MsgA are close, the uplink power of the UE climbs; otherwise, the uplink power does not climb. The method for determining whether resources for Msg1 or MsgA transmission are close includes at least one of the following: in the same bandwidth, resources for the synchronization signal block (SSB) or channel state information-reference signal (CSI-RS) remain unchanged.

It should be noted that, for related content included in step 10 to step 15, reference may be made to the related description in the foregoing embodiment, and details are not repeated herein.

Implementation 2

Figure 8:
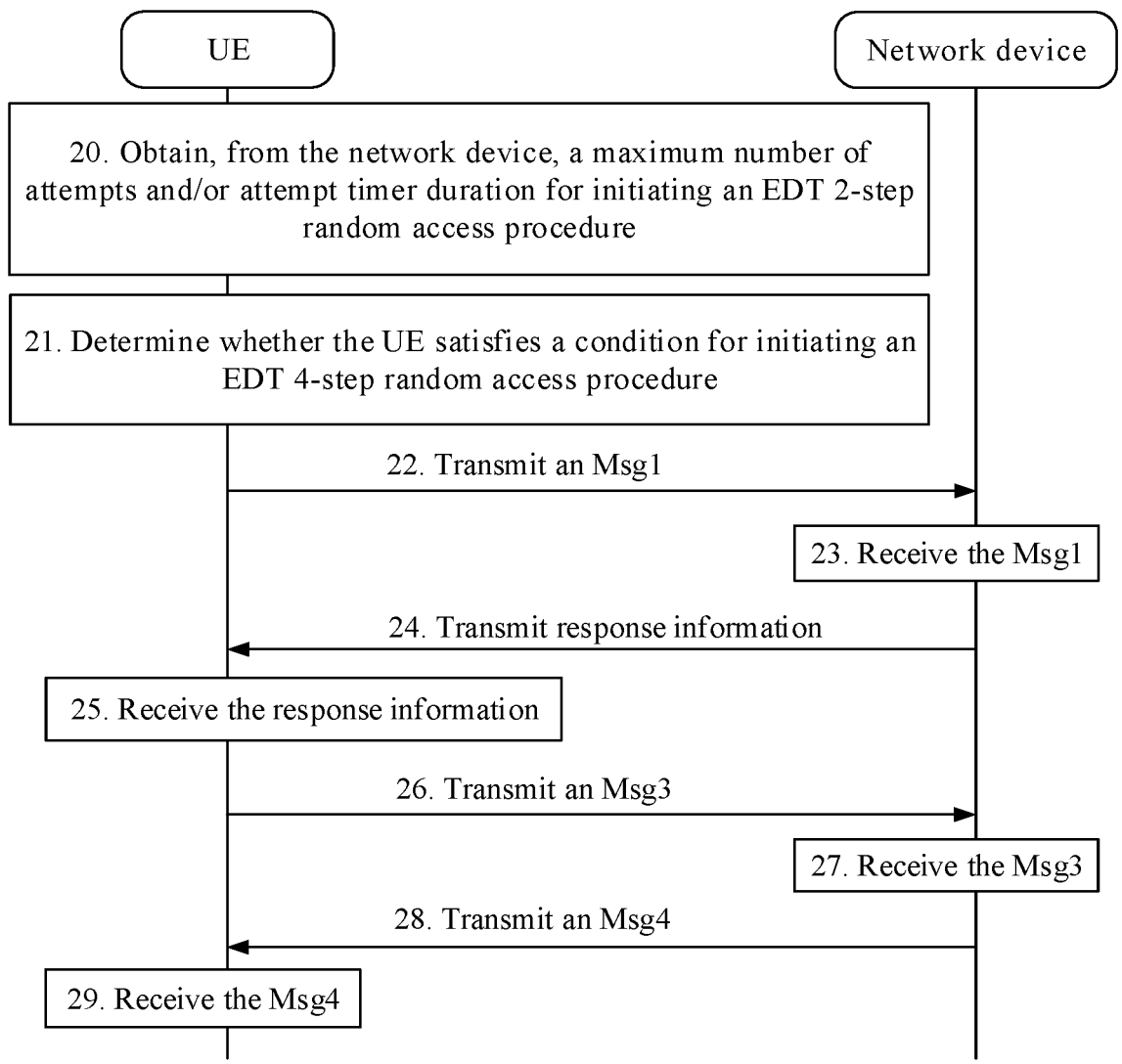
FIG. 8 is a seventh schematic diagram of a method for random access procedure fallback according to an embodiment of this disclosure.

In this implementation, a specific method for falling back from the EDT 4-step random access procedure to the 4-step random access procedure is mainly described. As shown in FIG. 8, the method for random access procedure fallback provided in this embodiment of this disclosure may include the following steps 20 to 29.

When the network device configures a fallback condition of the EDT 4-step random access procedure (UL EDT 4-step RACH) for the UE by using a SIB or dedicated signaling, the UE needs to check whether the condition is satisfied. Once the condition is met, the UE gives up another UL EDT 4-step RACH attempt, and initiates the normal 4-step RACH procedure.

Step 20: The UE obtains, from the network device, a maximum number of attempts and/or attempt timer duration for initiating the EDT 2-step random access procedure.

In this embodiment of this disclosure, the UE may obtain a fallback restriction condition from the network device, such as the maximum number of attempts (the first threshold) for initiating the EDT 4-step random access procedure, and the attempt timer duration (the second threshold) for initiating the EDT 4-step random access procedure.

Step 21: The UE determines whether the UE satisfies the condition for initiating the EDT 4-step random access procedure.

Step 22: The UE transmits a Msg1 to the network device.

In this embodiment of this disclosure, if it is determined that the UE satisfies the condition (the second condition in the foregoing embodiment) for initiating the EDT 4-step random access procedure (UL EDT 4-step RACH), an appropriate resource for the Msg1 is selected to initiate Msg1 transmission, where a preamble sequence value or a resource position for the Msg1 is different from that of a Msg1 in the 4-step RACH.

The condition for determining by the UE whether to initiate the UL EDT 4-step RACH may include at least one of the following: a service to be transmitted by the UE satisfies a trigger condition of the EDT 4-step random access procedure, a data volume of the service to be transmitted by the UE satisfies a resource restriction condition of the EDT 4-step random access procedure, and a type of the UE satisfies an initiation restriction condition of the EDT 4-step random access procedure.

In addition, if the fallback condition is configured based on the number of attempts, the initial value of the UL EDT attempt counter is 0, and the counter is incremented by 1 each time the UL EDT attempt is performed. If the fallback condition is configured based on the timer duration, the UL EDT attempt timer is started when the UL EDT RACH is initiated for the first time. A time point of starting the timer is specified by the standard, for example, a time point of triggering the UL EDT for the first time, a starting position or an ending position of a Msg1 resource corresponding to the UL EDT, or the like.

If the condition for UL EDT transmission is not satisfied in the current Msg1 transmission, for example, arrival of new uplink data causes a data volume of to-be-transmitted data to exceed a maximum resource size configured for the UL EDT), the UE is not allowed to perform UL EDT RACH transmission. In this case, the UE automatically falls back to the normal RACH procedure, the UL EDT counter is reset, or the UL EDT attempt timer is stopped.

When the UE satisfies the UL EDT fallback condition, for example, the UL EDT attempt timer expires or the UL EDT counter is greater than the configured threshold, even if a condition for UL EDT 4-step RACH is satisfied when the UE attempts to initiate RACH again, the UE is not allowed to initiate the UL EDT 4-step RACH again, but needs to fall back to the normal 4-step RACH procedure.

A manner of distinguishing the UL EDT 4-step RACH procedure and the 4-step RACH procedure may include at least one of the following: preamble sequences corresponding to the two procedures are different, and different preamble sequence spaces need to be selected for initiating different procedures; resource positions for the Msg1 corresponding to the two procedures are different, and different resource positions for the Msg1 need to be selected for initiating different procedures; and user data is not included in the 4-step RACH procedure (for non-connected-state UEs).

Step 23: The network device receives the Msg1 transmitted by the UE.

Step 24: The network device transmits response information to the UE.

In this embodiment of this disclosure, after receiving the Msg1, the network device may determine, based on different preamble sequences or resource positions for the Msg1, whether this is a normal 4-step RACH procedure (the 4-step RACH procedure) or an UL EDT RACH procedure, and transmits a response.

Generally, content of a response by the network device for the normal 4-step RACH may include at least one of the following: an RAP ID, used for distinguishing different preamble sequences; an uplink grant (UL Grant) for the UE, used for subsequent uplink data transmission; uplink timing advance (TA) for the UE; and a temporary cell identity (Temp C-RNTI) allocated to the UE.

A difference between content of a response by the network device for the UL EDT 4-step RACH and the content of the response for the normal 4-step RACH includes at least one of the following: an explicit UL EDT response indication, where the network device provides an explicit indication in an RAR (RACH Response message, namely Msg2), as a reply to the UL EDT Msg1; and UL Grant generally being a relatively large resource, significantly larger than that for the normal RACH procedure. Generally, an uplink transmission data volume required for the Msg3 in the normal RACH procedure is 56 bits or 72 bits; however, for the UL EDT RACH, the Msg3 requires a resource size of hundreds of bits or even thousands of bits.

Step 25: The UE receives the response information transmitted by the network device.

In this embodiment of this disclosure, if the RAP ID matches that of the UE, it means that it may be a RAR reply to the UE, and the UE transmits a Msg3 based on content in the RAR.

If the RAR indicates that this is a reply to an UL EDT Msg1, the UE may transmit UL EDT data in the Msg3 message based on an UL resource size (which is, for example, large enough to accommodate the data). Otherwise, if the UE finds no UL EDT indication in the RAR, or the resource size is not large enough to accommodate the data, the UE transmits a Msg3 with conventional content, not including the UL EDT data.

If a response message for the UE has not been received until a RAR timer of the UE expires, the current RACH procedure fails. The UE goes back to step 21 and initiates the EDT 4-step RACH procedure again until the UE satisfies a RACH failure condition and performs reporting to the higher layer.

Step 26: The UE transmits a Msg3 to the network device.

Step 27: The network device receives the Msg3 transmitted by the UE.

In this embodiment of this disclosure, the network device may determine, based on content and a resource position of the Msg3, whether this is an UL EDT procedure or a normal RACH procedure, so as to transmit a reply accordingly.

Generally, content of a Msg4 by the network device for the normal 4-step RACH may include at least one of the following: a contention resolution ID; and content of RRC signaling, such as RRC setup. For the UL EDT 4-step RACH, the content of the Msg4 may include at least one of the following: a contention resolution ID; and a reply for UL EDT, such as early data complete or RRC release.

Step 28: The network device transmits a Msg4 to the UE.

Step 29: The UE receives the Msg4 transmitted by the network device.

In this embodiment of this disclosure, when the contention resolution is successful, it means that the RACH procedure of the UE is successful. Further, when a correct UL EDT response message is received, the UL EDT is successful. If other response messages for the UL EDT are received, UL EDT data transmission may be unsuccessful, and an operation is performed according to a command of the network device. For example, if the network device returns an RRC setup message, the UE enters a connected state and retransmits user data that has not been successfully transmitted in the UL EDT procedure.

If a response message for the UE has not been received until the contention resolution timer of the UE expires, the current RACH procedure fails. The UE goes back to step 21 and initiates the EDT 4-step RACH procedure again until the UE satisfies a RACH failure condition and performs reporting to the higher layer.

When the UE fails in the UL EDT 4-step RACH procedure for one time and satisfies a condition for falling back to a normal RACH, the UE may possibly directly fall back to the 2-step RACH procedure, instead of falling back to the 4-step RACH procedure. For example, considering load balancing, the UE determines, based on a specific random number, whether to fall back to the 4-step RACH procedure or the 2-step RACH procedure. A threshold of the random number is network-configured. For example, whether to initiate the 4-step RACH or 2-step RACH is determined based on probabilities of 0.4 and 0.6, respectively.

It should be noted that for related content included in step 20 to step 29, reference may be made to the related description in the foregoing embodiment, and details are not repeated herein.

When the network device configures, for the UE by using a SIB or dedicated signaling, a condition for falling back from the UL EDT 2-step RACH to the UL EDT 4-step RACH, the UE needs to check whether the condition is satisfied. Once the condition is met, the UE gives up another UL EDT 2-step RACH attempt, and initiates the UL EDT 4-step RACH procedure.

It should be noted that a method for falling back from the EDT 2-step random access procedure to the EDT 4-step random access procedure by the UE is similar to the methods described in the foregoing implementations 1 and 2. For details, refer to specific descriptions of the foregoing embodiments. Details are not repeated herein.

Implementation 3

Figure 9:
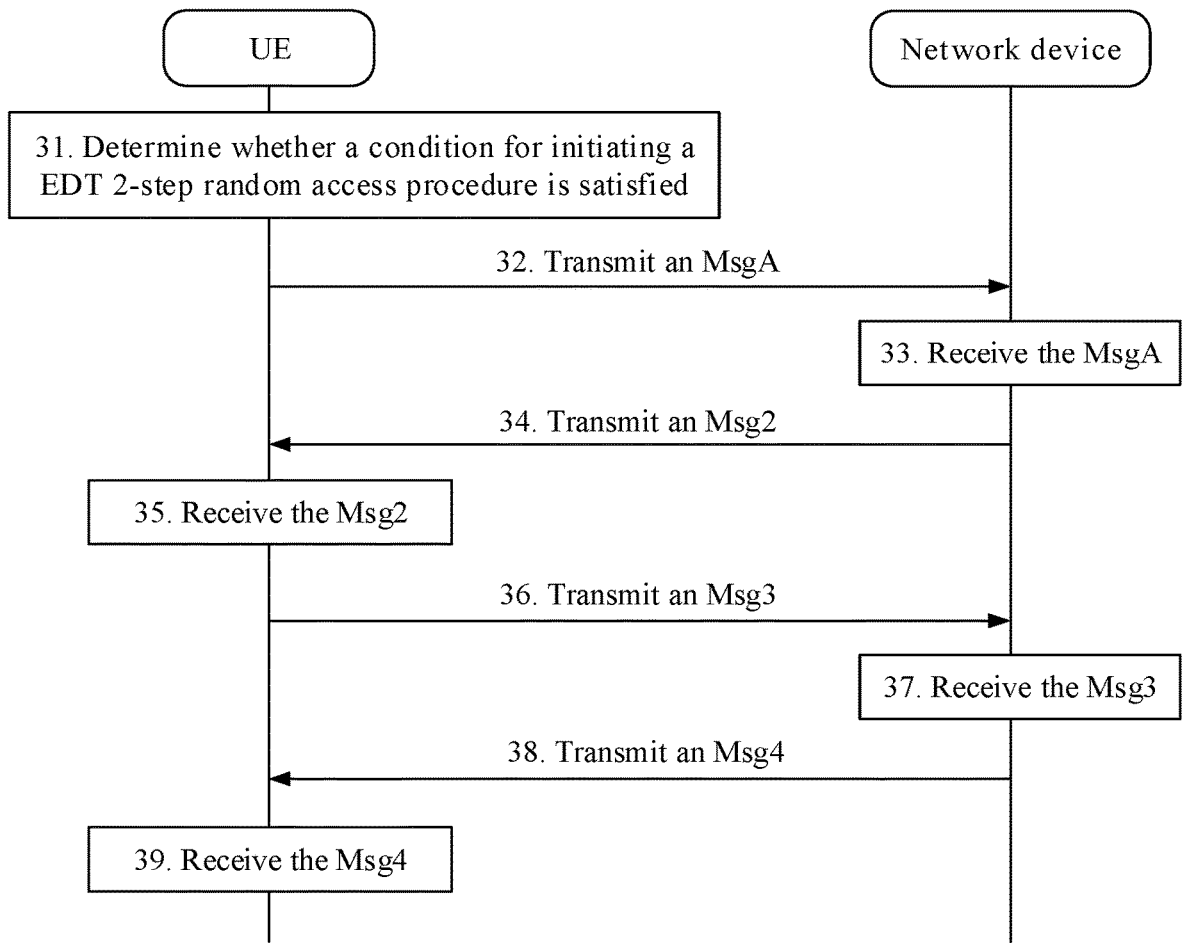
FIG. 9 is an eighth schematic diagram of a method for random access procedure fallback according to an embodiment of this disclosure.

A specific method for falling back from the EDT 2-step random access procedure to the EDT 4-step random access procedure by the UE based on an indication of the network device is mainly described in this implementation. As shown in FIG. 9, the method for random access procedure fallback provided in this embodiment of this disclosure may include the following steps 31 to 39.

Step 31: The UE determines whether a condition for initiating the EDT 2-step random access procedure is satisfied.

Step 32: The UE transmits a MsgA to the network device.

In this embodiment of this disclosure, if it is determined that the UE satisfies the condition (the second condition in the foregoing embodiment) for initiating the EDT 2-step random access procedure (UL EDT 2-step RACH), an appropriate resource for the MsgA is selected to initiate MsgA transmission, where the MsgA carries the UL EDT data of the UE.

Step 33: The network device receives the MsgA transmitted by the UE.

Step 34: The network device transmits a Msg2 to the UE.

In this embodiment of this disclosure, the Msg2 in step 34 carries UL EDT indication information (the first indication information in the foregoing embodiment).

In this embodiment of this disclosure, when the network device receives the MsgA, only a preamble sequence is successfully received, but content in the PUSCH for the MsgA is not successfully decoded, equivalent to that the network device can learn, based on a value of the preamble sequence or the resource position, that the MsgA corresponds to one UL EDT request, but has not received a real request message and data from the UE; or based on an algorithm requirement of the network device, that is, based on an implementation algorithm of the network device, the network device may return to the UE a Msg2 corresponding to the UL EDT 4-step RACH, where the Msg2 carries an explicit UL EDT RAR indication and a relatively large UL Grant that are used for transmitting, by the UE, a Msg3 that carries UL EDT data.

Step 35: The UE receives the Msg2 transmitted by the network device.

In this embodiment of this disclosure, after receiving the UL EDT indication carried in the Msg2, the UE may perform the UL EDT 4-step RACH procedure subsequently according to the indication (indicating that the UE falls back to the UL EDT 4-step RACH procedure) of the network device, that is, the UE subsequently performs step 28 in the foregoing implementation 2.

Step 36: The UE transmits a Msg3 to the network device.

Step 37: The network device receives the Msg3 transmitted by the UE.

Step 38: The network device transmits a Msg4 to the UE.

Step 39: The UE receives the Msg4 transmitted by the network device.

It should be noted that, for the specific descriptions of step 35 to step 39, reference may be made to the specific descriptions of step 25 to step 29 in the foregoing implementation 2, and details are not repeated herein.

If the process is successful, the entire UL EDT 4-step RACH procedure is successful. If there is a failure, the UE may perform failure handling for the UL EDT 2-step RACH in the foregoing implementation 1, or failure handling for the UL EDT 4-step RACH in the foregoing implementation 2.

Optionally, in this embodiment of this disclosure, in the foregoing step 34, the network device may alternatively returns content of a Msg2 for the normal 4-step RACH, indicating that the UE falls back to the normal 4-step RACH procedure. Subsequent steps are exactly the same as those of the 4-step RACH procedure in the existing process.

If the process is successful, the entire 4-step RACH procedure is successful, and subsequently the UE enters the connected state to transmit part of data that has not been transmitted in the UL EDT. If there is a failure, the UE may perform failure handling for the UL EDT 2-step RACH in implementation 1, or failure handling for the conventional 4-step RACH.

It should be noted that for related content included in step 31 to step 39, reference may be made to the related description in the foregoing embodiment, and details are not repeated herein.

Figure 10:
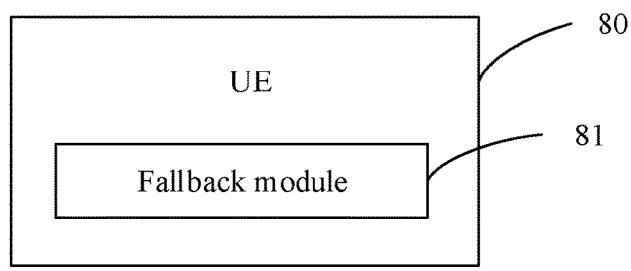
FIG. 10 is a first schematic structural diagram of UE according to an embodiment of this disclosure.

FIG. 10 is a possible schematic structural diagram of UE included in the embodiments of this disclosure. As shown in FIG. 10, the UE 80 provided in this embodiment of this disclosure may include a fallback module 81.

The fallback module 81 is configured to: in a case that the UE initiates a first random access procedure, fall back from the first random access procedure to a target random access procedure based on first information, where the first information is information about the first random access procedure or information about the target random access procedure.

In a possible implementation, the first information includes first parameter information or first indication information. The first parameter information may include at least one of the following: the number of times that the UE initiates the first random access procedure and total duration of the first random access procedures initiated by the UE. The first indication information is information carried in a response message of the target random access procedure, and the first indication information is used to indicate that the UE is to fall back to the target random access procedure.

In a possible implementation, the first information includes the first parameter information, and the first parameter information includes the number of times that the UE initiates the first random access procedure. The fallback module 81 is specifically configured to: if the number of times that the UE initiates the first random access procedure is greater than or equal to a first threshold, fall back from the first random access procedure to the target random access procedure.

In a possible implementation, the first information includes the first parameter information, and the first parameter information includes total duration of the first random access procedures initiated by the UE. The fallback module 81 is specifically configured to: if the total duration of the first random access procedures initiated by the UE is greater than or equal to a second threshold, fall back from the first random access procedure to the target random access procedure.

In a possible implementation, the first random access procedure is an EDT 2-step random access procedure, and the target random access procedure is a 2-step random access procedure, a 4-step random access procedure, or an EDT 4-step random access procedure. Alternatively, the first random access procedure is an EDT 4-step random access procedure, and the target random access procedure is a 2-step random access procedure, a 4-step random access procedure, or an EDT 2-step random access procedure.

In a possible implementation, the target random access procedure is a 2-step random access procedure or a 4-step random access procedure. The fallback module 81 is specifically configured to: if a first fallback random number is less than a fallback random number threshold, fall back from the first random access procedure to the 2-step random access procedure, where the first fallback random number is a fallback random number generated by the UE; or if the first fallback random number is greater than the fallback random number threshold, fall back from the first random access procedure to the 4-step random access procedure; or, the fallback module 81 is specifically configured to: if the first fallback random number is less than the fallback random number threshold, fall back from the first random access procedure to the 4-step random access procedure; or if the first fallback random number is greater than the fallback random number threshold, fall back from the first random access procedure to the 2-step random access procedure.

In a possible implementation, the first information includes the first indication information. The fallback module 81 is specifically configured to: according to the first indication information, fall back from the first random access procedure to a random access procedure indicated by the first indication information; where the random access procedure indicated by the first indication information may be any one of the following: a 2-step random access procedure, a 4-step random access procedure, an EDT 2-step random access procedure, and an EDT 4-step random access procedure.

Figure 11:
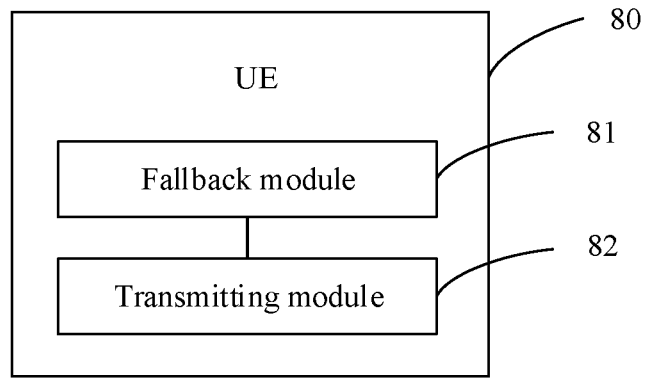
FIG. 11 is a second schematic structural diagram of UE according to an embodiment of this disclosure.

In a possible implementation, with reference to FIG. 10, as shown in FIG. 11, the UE 80 provided in this embodiment of this disclosure may further include: a transmitting module 82. The transmitting module 82 is configured to: in a case that a first condition is met, report second indication information to a higher layer, where the second indication information is used to indicate that the UE has a radio link failure; and the first condition includes at least one of the following: the number of times that the UE transmits a first message is greater than or equal to a third threshold, the number of times that the UE transmits a second message is greater than or equal to a fourth threshold, the total number of times that the UE transmits the first message and the second message is greater than or equal to a fifth threshold, and total duration of a random access procedure initiated by the UE is greater than or equal to a sixth threshold; and the first message is a request message for a 2-step random access procedure, and the second message is a request message for a 4-step random access procedure.

Figure 12:
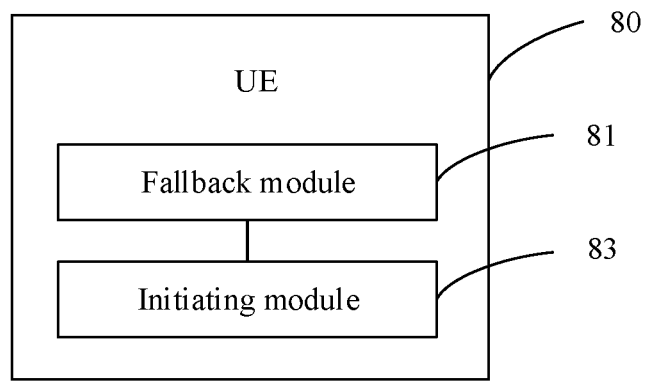
FIG. 12 is a third schematic structural diagram of UE according to an embodiment of this disclosure.

In a possible implementation, the first random access procedure is an EDT random access procedure. With reference to FIG. 10, as shown in FIG. 12, the UE 80 provided in this embodiment of this disclosure may further include an initiating module 83. The initiating module 83 is configured to: in a case that the UE satisfies a second condition, initiate the first random access procedure; where the second condition may include at least one of the following: a service to be transmitted by the UE satisfies a trigger condition of a 2-step random access procedure or a 4-step random access procedure, a data volume of the service to be transmitted by the UE satisfies a resource restriction condition of an EDT random access procedure, and a type of the UE satisfies an initiation restriction condition of the EDT random access procedure.

The UE provided in this embodiment of the disclosure is capable of implementing various processes implemented by the UE in the foregoing method embodiment. To avoid repetition, the specific description is not repeated herein.

The UE provided in this embodiment of this disclosure can perform fallback during initiation of the first random access procedure based on the information about the first random access procedure or information about the target random access procedure, instead of continuously attempting to initiate the first random access procedure, thereby reducing a delay and signaling overheads for data transmission in the random access procedure.

Figure 13:
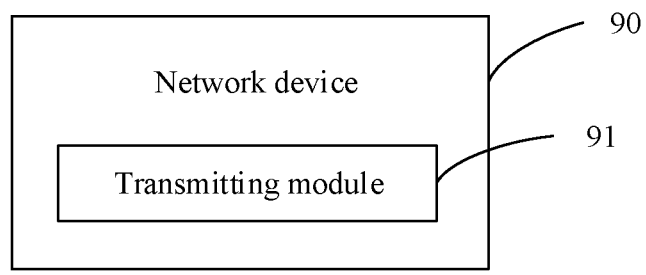
FIG. 13 is a schematic structural diagram of a network device according to an embodiment of this disclosure.

FIG. 13 is a possible schematic structural diagram of a network device included in the embodiments of this disclosure. As shown in FIG. 13, the network device 90 provided in this embodiment may include a transmitting module 91.

The transmitting module 91 is configured to: transmit a target response message to UE, where the target response message is a response message of a target random access procedure, the target response message includes first indication information, and the first indication information is used to indicate that the UE is to fall back to the target random access procedure.

In a possible implementation, the target random access procedure may be any one of the following: a 2-step random access procedure, a 4-step random access procedure, an EDT 2-step random access procedure, and an EDT 4-step random access procedure.

The network device provided in this embodiment of the disclosure is capable of implementing various processes implemented by the network device in the foregoing method embodiment. To avoid repetition, the specific description is not repeated herein.

In the network device provided in this embodiment of this disclosure, because the network device can transmit the target response message (the target response message includes the first indication information) to the UE to indicate that the UE is to fall back to the target random access procedure. This prevents the UE from continuously attempting to initiate the first random access procedure, reducing a delay and signaling overheads for data transmission in the random access procedure.

Figure 14:
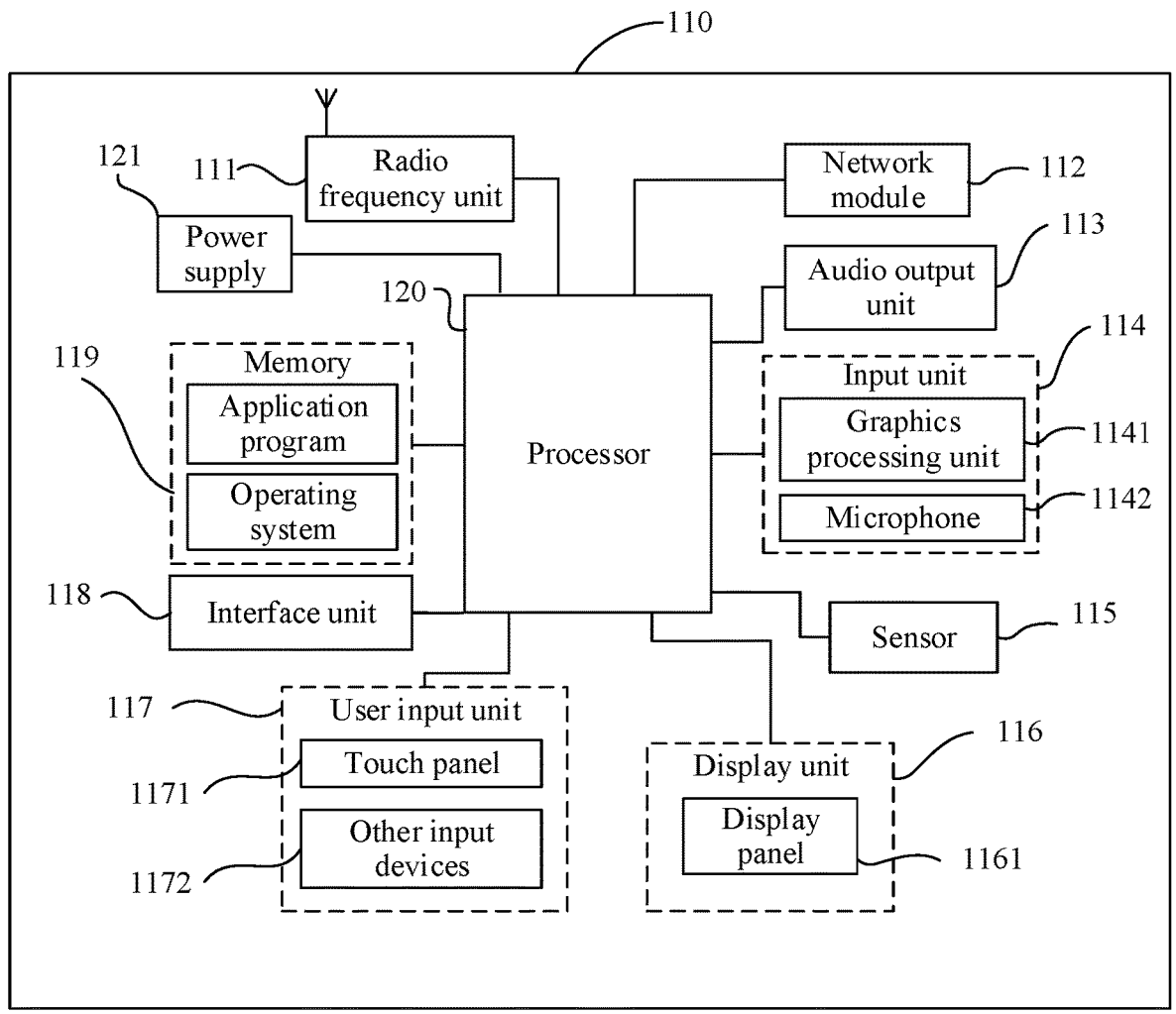
FIG. 14 is a schematic hardware diagram of UE according to an embodiment of this disclosure.

FIG. 14 is a schematic hardware diagram of UE according to an embodiment of this disclosure. As shown in FIG. 14, the UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art can understand that the structure of the UE shown in FIG. 14 does not constitute any limitation on the UE. The UE device may include more or fewer components than those shown in FIG. 14, or a combination of some components, or the components disposed differently. For example, in this embodiment of this disclosure, the UE includes but is not limited to a mobile phone, a tablet computer, a notebook computer, a palmtop computer, an in-vehicle terminal, a wearable device, a pedometer, or the like.

The processor 120 is configured to: in a case that the UE initiates a first random access procedure, fall back from the first random access procedure to a target random access procedure based on first information, where the first information is information about the first random access procedure or information about the target random access procedure.

The UE provided in this embodiment of this disclosure can perform fallback during initiation of the first random access procedure based on the information about the first random access procedure or information about the target random access procedure, instead of continuously attempting to initiate the first random access procedure, thereby reducing a delay and signaling overheads for data transmission in the random access procedure.

It should be understood that in this embodiment of this disclosure, the radio frequency unit 111 may be configured to receive and send information, or to receive and send a signal in a call process, and specially, after receiving downlink data from a base station, send the downlink data to the processor 120 for processing; and also send uplink data to the base station. Generally, the radio frequency unit 111 includes but is not limited to an antenna, at least one amplifier, a transceiver, a coupler, a low noise amplifier, a duplexer, and the like. In addition, the radio frequency unit 111 may also communicate with a network and other devices via a wireless communications system.

The UE provides wireless broadband Internet access for a user by using the network module 112, for example, helps the user send and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may also provide audio output (for example, a call signal reception sound or a message reception sound) related to a specific function performed by the UE 110. The audio output unit 113 includes a speaker, a buzzer, a receiver, and the like.

The input unit 114 is configured to receive an audio or video signal. The input unit 114 may include a graphics processing unit (GPU) 1141 and a microphone 1142. The graphics processing unit 1141 processes image data of a still picture or video obtained by an image capture apparatus (such as a camera) in a video capture mode or an image capture mode. A processed image frame may be displayed on the display unit 116. The image frame processed by the graphics processing unit 1141 may be stored in the memory 119 (or another storage medium) or be sent by the radio frequency unit 111 or the network module 112. The microphone 1142 is capable of receiving sounds and processing such sounds into audio data. The processed audio data can be converted into a format output that can be sent to a mobile communication base station through the radio frequency unit 111 in a telephone call mode.

The UE 110 further includes at least one sensor 115, for example, an optical sensor, a motion sensor, and another sensor. Specifically, the optical sensor may include an ambient light sensor and a proximity sensor. The ambient light sensor may adjust luminance of the display panel 1161 based on brightness of ambient light, and the proximity sensor may turn off the display panel 1161 and/or backlight when the UE 110 moves close to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the UE (such as switching between landscape and portrait, related games, and magnetometer posture calibration), implement vibration recognition related functions (such as a pedometer and stroke), and the like. The sensor 115 may further include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided to the user. The display unit 116 may include a display panel 1161, and the display panel 1161 may be configured in a form of a liquid crystal display (LCD), an organic light-emitting diode (OLED), or the like.

The user input unit 117 may be configured to receive input digit or character information, and generate a key signal input related to a user setting and function control of the UE. Specifically, the user input unit 117 may include a touch panel 1171 and other input devices 1172. The touch panel 1171 is also referred to as a touchscreen and can collect a touch operation (such as an operation performed by the user on the touch panel 1171 or near the touch panel 1171 with a finger or by using any proper object or accessory such as a stylus) of the user on or near the touch panel 1171. The touch panel 1171 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 120, and can receive a command sent by the processor 120 and execute the command. In addition, the touch panel 1171 may be implemented in a plurality of forms, for example, as a resistive, capacitive, infrared, or surface acoustic wave touch panel. The user input unit 117 may further include other input devices 1172 in addition to the touch panel 1171. Specifically, the other input devices 1172 may include but are not limited to a physical keyboard, a function key (such as a volume control key or a switch key), a trackball, a mouse, and a joystick. Details are not described herein.

Further, the touch panel 1171 may cover the display panel 1161. When detecting a touch operation on or near the touch panel 1171, the touch panel 1171 transmits the touch operation to the processor 120 to determine a type of a touch event. Then, the processor 120 provides a corresponding visual output on the display panel 1161 based on the type of the touch event. Although in FIG. 14, the touch panel 1171 and the display panel 1161 act as two independent parts to implement input and output functions of the UE, in some embodiments, the touch panel 1171 and the display panel 1161 may be integrated to implement the input and output functions of the UE. This is not specifically limited herein.

The interface unit 118 is an interface between an external apparatus and the UE 110. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 118 may be configured to receive an input (for example, data information or power) from an external apparatus and transmit the received input to one or more elements within the UE 110, or may be configured to transmit data between the UE 110 and the external apparatus.

The memory 119 may be configured to store software programs and various data. The memory 119 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 119 may include a high-speed random access memory, and may further include a non-volatile memory such as a disk storage device, a flash memory device, or another volatile solid-state storage device.

The processor 120 is a control center of the UE. The processor 120 uses various interfaces and lines to connect all parts of the entire UE, and performs various functions and data processing of the UE by running or executing the software program and/or module stored in the memory 119 and invoking data stored in the memory 119, thereby performing overall monitoring on the UE. The processor 120 may include one or more processing units. Optionally, an application processor and a modem processor may be integrated in the processor 120. The application processor primarily processes an operating system, user interfaces, application programs, and the like. The modem processor primarily processes radio communication. It can be understood that the modem processor may alternatively be not integrated in the processor 120.

The UE 110 may further include the power supply 121 (for example, a battery) supplying power to all components. Optionally, the power supply 121 may be logically connected to the processor 120 through a power management system. In this way, functions such as charge management, discharge management, and power consumption management are implemented by using the power management system.

In addition, the UE 110 includes some functional modules that are not shown. Details are not described herein.

Optionally, an embodiment of this disclosure further provides UE, including the processor 120 and the memory 119 that are shown in FIG. 14, and a computer program that is stored in the memory 119 and can be run by the processor 120. When the computer program is executed by the processor 120, each process of the foregoing method embodiment is implemented, and a same technical effect can be achieved. To avoid repetition, details are not described again herein.

An embodiment of this disclosure further provides a computer-readable storage medium, where the computer-readable storage medium stores a computer program. When the computer program is executed by the processor 120 shown in FIG. 14, each process of the foregoing method embodiment is implemented, and a same technical effect can be achieved. To avoid repetition, details are not described again herein. The computer-readable storage medium is, for example, a read-only memory (ROM), a random access memory (RAM), a magnetic disk, or an optical disc.

Figure 15:
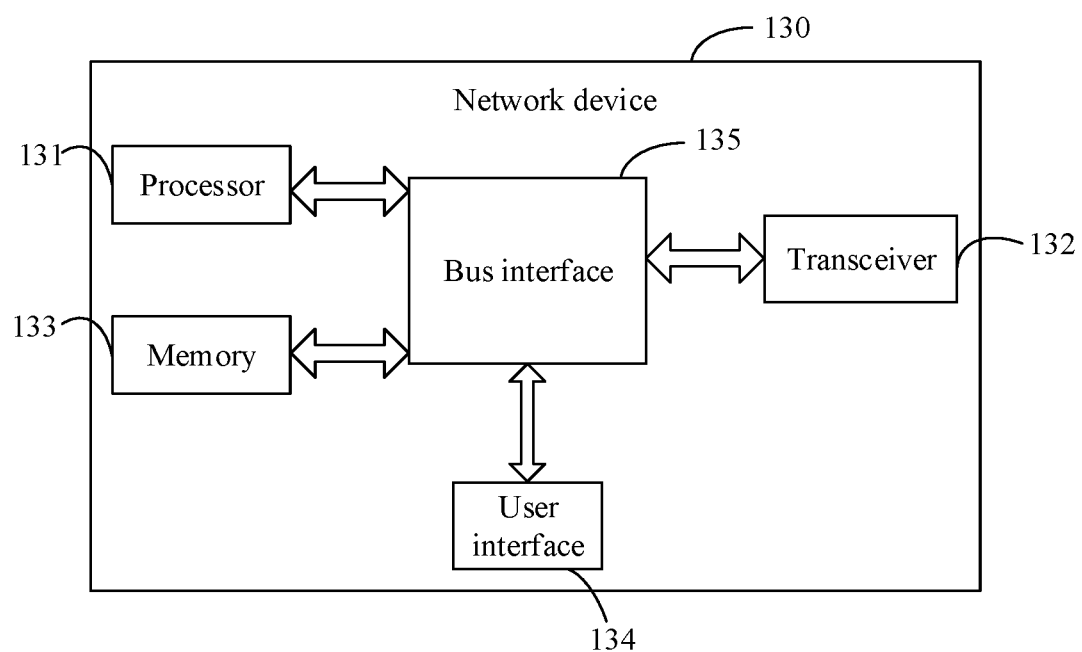
FIG. 15 is a schematic hardware diagram of a network device according to an embodiment of this disclosure.

FIG. 15 is a schematic hardware diagram of a network device according to an embodiment of this disclosure. As shown in FIG. 15, the network device 130 includes a processor 131, a transceiver 132, a memory 133, a user interface 134, and a bus interface 135.

The transceiver 132 is configured to: transmit a target response message to UE, where the target response message is a response message of a target random access procedure, the target response message includes first indication information, and the first indication information is used to indicate that the UE is to fall back to the target random access procedure.

In the network device provided in this embodiment of this disclosure, because the network device can transmit the target response message (the target response message includes the first indication information) to the UE to indicate that the UE is to fall back to the target random access procedure. This prevents the UE from continuously attempting to initiate the first random access procedure, reducing a delay and signaling overheads for data transmission in the random access procedure.

The processor 131 may be responsible for managing a bus architecture and usual processing, and the processor 131 may be configured to read and execute programs in the memory 133 to implement processing functions and control of the network device 130. The memory 133 may store data that is used when the processor 131 performs an operation. The processor 131 and the memory 133 may be integrated, or separately disposed.

In this embodiment of this disclosure, the network device 130 may further include a computer program stored in the memory 133 and capable of running on the processor 131. When the computer program is executed by the processor 131, the steps of the method provided in the embodiments of this disclosure are implemented.

In FIG. 15, a bus architecture may include any quantity of interconnected buses and bridges, specifically for interconnecting various circuits of one or more processors represented by the processor 131 and a memory represented by the memory 133. The bus architecture may further interconnect various other circuits such as a peripheral device, a voltage regulator, and a power management circuit. These are all well known in the art, and therefore are not further described in the embodiments of this disclosure. The bus interface 135 provides an interface. The transceiver 132 may be a plurality of components, that is, the transceiver 132 includes a transmitter and a receiver, and provides a unit for communicating with various other apparatuses on a transmission medium. For different UEs, the user interface 134 may also be an interface that can be externally or internally connected to a required device. The connected device includes but is not limited to a keypad, a display, a speaker, a microphone, a joystick, and the like.

An embodiment of this disclosure further provides a computer-readable storage medium, where the computer-readable storage medium stores a computer program. When the computer program is executed by the processor 131 shown in FIG. 15, each process of the foregoing method embodiment is implemented, and a same technical effect can be achieved. To avoid repetition, details are not described again herein. The computer-readable storage medium is, for example, a ROM, a RAM, a magnetic disk, or an optical disc.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for random access procedure fallback, applied to user equipment UE, wherein the method comprises:
   in a case that the UE initiates a first random access procedure, falling back from the first random access procedure to a target random access procedure based on first information, wherein the first information is information about the first random access procedure or information about the target random access procedure;
   in a case that a first condition is met, reporting second indication information to a layer higher than a Media Access Control (MAC) layer of the UE, wherein the second indication information is used to indicate that the UE has a radio link failure; and
   wherein the first condition comprises: the total number of times that the UE transmits a first message and a second message is greater than or equal to a fifth threshold; and the first message is a request message for a 2-step random access procedure, and the second message is a request message for a 4-step random access procedure,
   wherein the first information comprises first indication information, the first indication information is information carried in a response message of the target random access procedure, and the first indication information is used to indicate that the UE is to fall back to the target random access procedure.

2. The method according to claim 1, wherein the first random access procedure is an early data transmission (EDT) 2-step random access procedure, and the target random access procedure is a 2-step random access procedure, 4-step random access procedure, or EDT 4-step random access procedure.

3. The method according to claim 1, wherein
   the falling back from the first random access procedure to a target random access procedure based on first information comprises:
   according to the first indication information, falling back from the first random access procedure to a random access procedure indicated by the first indication information; wherein
   the random access procedure indicated by the first indication information is any one of the following: a 2-step random access procedure, a 4-step random access procedure, an EDT 2-step random access procedure, and an EDT 4-step random access procedure.

4. The method according to claim 1, wherein
   the first condition further comprises at least one of the following: the number of times that the UE transmits a first message is greater than or equal to a third threshold, the number of times that the UE transmits a second message is greater than or equal to a fourth threshold, and total duration of a random access procedure initiated by the UE is greater than or equal to a sixth threshold.

5. The method according to claim 1, wherein the first random access procedure is an EDT random access procedure, and the method further comprises:
   in a case that the UE satisfies a second condition, initiating the first random access procedure; wherein
   the second condition comprises at least one of the following: a service to be transmitted by the UE satisfies a trigger condition of a 2-step random access procedure or a 4-step random access procedure, a data volume of the service to be transmitted by the UE satisfies a resource restriction condition of an EDT random access procedure, and a type of the UE satisfies an initiation restriction condition of the EDT random access procedure.

6. A method for random access procedure fallback, applied to a network device, wherein the method comprises:
   transmitting a target response message to user equipment UE, wherein the target response message is a response message of a target random access procedure, the target response message comprises first indication information, and the first indication information is used to indicate that the UE is to fall back to the target random access procedure;
   performing a link reestablishment when second indication information is reported to a layer higher than a Media Access Control (MAC) layer of the UE in a case that a first condition is met, wherein the second indication information is used to indicate that the UE has a radio link failure; and
   wherein the first condition comprises: the total number of times that the UE transmits a first message and a second message is greater than or equal to a fifth threshold; and the first message is a request message for a 2-step random access procedure, and the second message is a request message for a 4-step random access procedure,
   wherein the first indication information is information carried in the response message of the target random access procedure, and the first indication information is used to indicate that the UE is to fall back to the target random access procedure.

7. The method according to claim 6, wherein the target random access procedure is any one of the following: a 2-step random access procedure, a 4-step random access procedure, an EDT 2-step random access procedure, and an EDT 4-step random access procedure.

8. User equipment UE, comprising a processor, a memory, and a computer program stored in the memory and capable of running on the processor, wherein when the computer program is executed by the processor, the steps of the method for random access procedure fallback are implemented, wherein the method comprises:
in a case that the UE initiates a first random access procedure, falling back from the first random access procedure to a target random access procedure based on first information, wherein the first information is information about the first random access procedure or information about the target random access procedure;
in a case that a first condition is met, reporting second indication information to a layer higher than a Media Access Control (MAC) layer of the UE, wherein the second indication information is used to indicate that the UE has a radio link failure; and
wherein the first condition comprises: the total number of times that the UE transmits a first message and a second message is greater than or equal to a fifth threshold; and the first message is a request message for a 2-step random access procedure, and the second message is a request message for a 4-step random access procedure,
wherein the first information comprises first indication information, the first indication information is information carried in a response message of the target random access procedure, and the first indication information is used to indicate that the UE is to fall back to the target random access procedure.

9. The User equipment UE according to claim 8, wherein the first random access procedure is an early data transmission (EDT) 2-step random access procedure, and the target random access procedure is a 2-step random access procedure, 4-step random access procedure, or EDT 4-step random access procedure.

10. The User equipment UE according to claim 8, wherein the falling back from the first random access procedure to a target random access procedure based on first information comprises:
according to the first indication information, falling back from the first random access procedure to a random access procedure indicated by the first indication information; wherein the random access procedure indicated by the first indication information is any one of the following: a 2-step random access procedure, a 4-step random access procedure, an EDT 2-step random access procedure, and an EDT 4-step random access procedure.

11. The User equipment UE according to claim 8, wherein the first condition further comprises at least one of the following: the number of times that the UE transmits a first message is greater than or equal to a third threshold, the number of times that the UE transmits a second message is greater than or equal to a fourth threshold, and total duration of a random access procedure initiated by the UE is greater than or equal to a sixth threshold.

12. The User equipment UE according to claim 8, wherein the first random access procedure is an EDT random access procedure, and wherein when the computer program is executed by the processor, the processor further implements,
in a case that the UE satisfies a second condition, initiating the first random access procedure; wherein
the second condition comprises at least one of the following: a service to be transmitted by the UE satisfies a trigger condition of a 2-step random access procedure or a 4-step random access procedure, a data volume of the service to be transmitted by the UE satisfies a resource restriction condition of an EDT random access procedure, and a type of the UE satisfies an initiation restriction condition of the EDT random access procedure.

13. A network device, comprising a processor, a memory, and a computer program stored in the memory and capable of running on the processor wherein when the computer program is executed by the processor, the steps of the method for random access procedure fallback according to claim 6 are implemented.

14. The network device according to claim 13, wherein, the target random access procedure is any one of the following: a 2-step random access procedure, a 4-step random access procedure, an EDT 2-step random access procedure, and an EDT 4-step random access procedure.

* * * * *